(12) United States Patent
Yadav et al.

(10) Patent No.: US 6,267,864 B1
(45) Date of Patent: *Jul. 31, 2001

(54) FIELD ASSISTED TRANSFORMATION OF CHEMICAL AND MATERIAL COMPOSITIONS

(75) Inventors: Tapesh K. Yadav; Bijan K. Meramadi, both of Longmont, CO (US)

(73) Assignee: Nanomaterials Research Corporation

( * ) Notice: Subject to any disclaimer, the term of this patent is extended or adjusted under 35 U.S.C. 154(b) by 0 days.

This patent is subject to a terminal disclaimer.

(21) Appl. No.: 09/286,698

(22) Filed: Apr. 6, 1999

Related U.S. Application Data

(63) Continuation-in-part of application No. 09/165,439, filed on Oct. 2, 1998.
(60) Provisional application No. 60/110,710, filed on Dec. 3, 1998, and provisional application No. 60/100,269, filed on Sep. 14, 1998.

(51) Int. Cl.[7] .............................. C25B 1/00; C25B 1/02; C25B 9/00; C25C 3/36; C25D 17/00
(52) U.S. Cl. .................... 205/341; 205/334; 205/413; 205/464; 205/637; 204/242; 204/230.2; 204/230.3; 204/265; 204/274; 204/278
(58) Field of Search ................... 204/242, 230.2, 204/230.3, 265, 274, 278; 205/341, 334, 413, 464, 637; 423/644

(56) References Cited

U.S. PATENT DOCUMENTS 5,945,231 * 8/1999 Narayanan et al. ............... 429/30

FOREIGN PATENT DOCUMENTS 48-20104 * 6/1973 (JP).
54-56071 * 5/1979 (JP).

OTHER PUBLICATIONS

Graham J. Hutchings, Catherine S. Heneghan, Ian D. Hudson and Stuart H. Taylor, "Uranium–Oxide–Based Catalysts for the Destruction of Volatile Chloro–Organic Compounds," Nature, vol. 384, Nov. 28 1996.

Tiejun Zhang and Michael D. Amiridis, "Hydrogen Production Via the Direct Cracking of Methane Over Silica–Supported Nickel Catalysts," Dept. of Chemical Engineering, University of South Carolina, Applied Catalysis A: General 167 (1988) 161–172.

M. L. Cubiero and J. L. G. Fierro, "Partial Oxidation of Methanol Over Supported Palladium Catalysts," Applied Catalysis A: General 168 (1988) 307–322, No month available.

* cited by examiner

Primary Examiner—Edna Wong
(74) Attorney, Agent, or Firm—Hogan & Hartson, L.L.P.

(57) ABSTRACT

Methods and devices for transforming less desirable chemical species into more desirable or useful chemical forms are disclosed. The specifications can be used to treat pollutants into more benign compositions and to produce useful chemicals from raw materials and wastes. The methods and devices disclosed utilize continuous or temporary pulse of electrical current induced by electromagnetic field and high surface area formulations. The invention can also be applied to improve the performance of existing catalysts and to prepare novel devices.

37 Claims, 4 Drawing Sheets

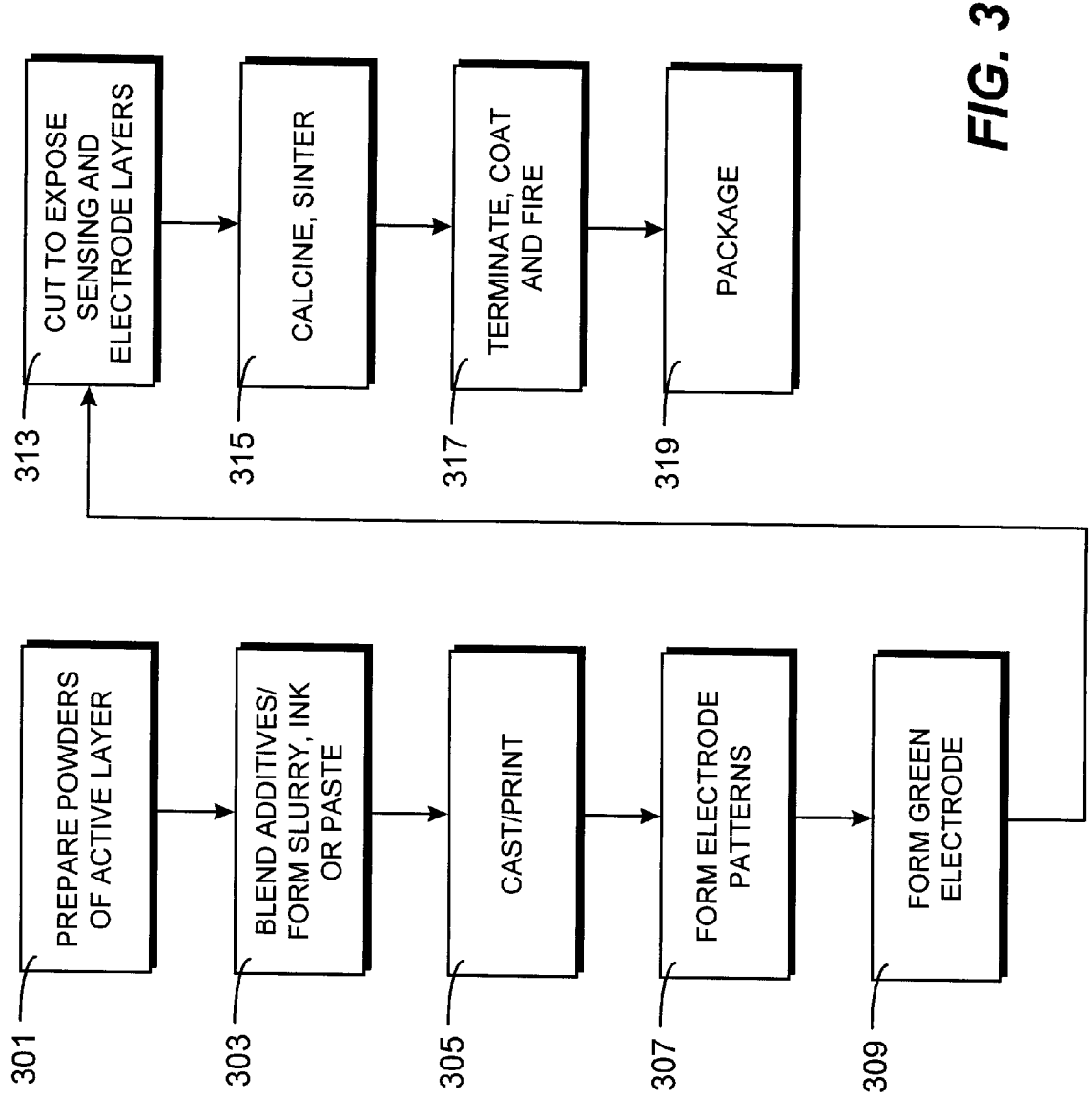

FIELD ASSISTED TRANSFORMATION OF CHEMICAL AND MATERIAL COMPOSITIONS

RELATED APPLICATIONS

This application claims benefit and priority of commonly assigned U.S. Provisional Application No. 60/110,710, "CATALYSIS NEAR AMBIENT TEMPERATURES" filed Dec. 3, 1998, and is a continuation-in-part of U.S. patent application Ser. No. 09/165,439 titled "A METHOD AND DEVICE FOR TRANSFORMING CHEMICAL COMPOSITIONS" filed Oct. 2, 1998, pending, which claims priority to U.S. Provisional Application 60/100,269 filed Sep. 14, 1998, the specifications of which are incorporated herein by reference.

BACKGROUND OF THE INVENTION

1. Field of the Invention

The present invention relates, in general, to catalytic processing and devices for catalytic processing, and, more particularly, to a method and apparatus for enhanced catalytic processing using nanomaterial catalyst compositions in an electric field.

2. Relevant Background

Chemical and materials synthesis and transformation is one of the core industries of world economy. Numerous substances are synthesized using processes that require non-ambient temperatures and/or non-ambient pressures that require capital intensive equipment. Methods that can produce useful chemicals and materials at conditions closer to ambient conditions and use simple equipment are economically, ecologically, and environmentally more desirable.

Chemical species such as volatile organic chemicals (VOCs), heavy metals in waste water and bioactive chemicals are pollutants of serious concern. A need exists for processes and devices that can convert these substances into more benign forms such as carbon dioxide and water vapor. Techniques currently in use include incineration, absorption/desorption, chemical wash and photocatalysis. Incineration is a high energy process and often leads to non-benign secondary emissions such as nitrogen oxides (NOx) and unburned hydrocarbons. Photocatalysis systems are expensive to install and require high maintenance to avoid degrading efficiencies and treatment reliability. Other techniques lead to secondary wastes and leave the ultimate fate of the pollutants unresolved. A technique is needed that can reliably treat chemical pollutants in a cost effective manner.

Numerous industries use catalytic processing techniques either to produce useful materials and compositions or to reduce waste or pollutants. Examples of such industries include those based on electricity generation, turbines, internal combustion engines, environmental and ecological protection, polymer and plastics manufacturing, petrochemical synthesis, specialty chemicals manufacturing, fuel production, batteries, biomedical devices, and pharmaceutical production. These industries are in continuous need of new catalysts and catalytic processes that can impact the costs and performance of the products generated by these industries.

Currently, processes and methods based on homogeneous and heterogeneous catalysis are integral and important to modern industrial, energy, and environmental chemistry. In petroleum and petrochemical industries, catalysis is used in numerous purification, refining, cracking, and/or reaction steps. In the purification of synthetic gaseous and liquid fuels from crude oil, coal, tar sand, and oil shale, catalysis is important. Approximately two thirds of leading the large tonnage chemicals are manufactured with the help of catalysis. Illustrative examples include acetic acid, acetaldehyde, acetone, acrylonitrile, adipic acid, ammonia, aniline, benzene, bisphenol A, butadiene, butanols, butanone, caprolactum, cumene, cyclohexane, cyclohexanone, cyclohexanol, phtalates, dodecylbenzene, ethanol, ethers, ethylbenzene, ethanol, methanol, ethylbenzene, ethylene dichloride, ethylene glycol, ethylene oxide, ethyl chloride, ethyl hexanol, formaldehyde, hydrogen, hydrogen peroxide, hydroxylamine, isoprene, isopropanol, maleic anhydride, methyl amines, methyl chloride, methylene chloride, nitric acid, perchloroethylene, phenol, phthalic anhydride, propylene glycol, propylene oxide, styrene, sulfur, sulfuric acid, acids, alkalis, terephthalic acid, toluene, vinyl acetate, vinyl chloride, and xylenes.

Further, most of the production of organic intermediates used to make plastics, elastomers, fibers, pharmaceuticals, dyes, pesticides, resins, and pigments involve catalytic process steps. Food, drinks, clothing, metals, and materials manufacturing often utilizes catalysts. Removal of atmospheric pollutants from automobile exhausts and industrial waste gases requires catalytic converters. Liquid wastes and stream also are routinely treated with catalysts. These applications need techniques, methods, and devices that can help research, identify, develop, optimize, improve, and practice superior performing catalysts of existing formulations, of evolved formulations, and of novel formulations.

Many new products are impractical to produce due to high manufacturing costs and/or low manufacturing yields of the materials that enable the production of such products. These limitations curtail the wide application of new materials. Novel catalysts can enable the production of products that are currently too expensive to manufacture or impossible to produce for wide ranges of applications that were, until now, cost prohibitive. A need exists for techniques to develop such novel catalysts.

The above and other limitations are solved by a chemical transformation device and method for processing chemical compositions that provides efficient, robust operation yet is implemented with a simplicity of design that enables low cost implementation in a wide variety of applications. These and other limitations are also solved by a method for making a chemical transformation device using cost efficient processes and techniques.

SUMMARY OF THE INVENTION

In one aspect, the invention includes a method of chemically transforming a substance through the simultaneous use of a catalyst and electrical current. This method comprises selecting an active material which interacts with an applied electromagnetic field to produce a current. A high surface area (preferably greater than 1 square centimeter per gram, more preferably 100 square centimeter per gram, and most preferably 1 square meter per gram) form of the active material is prepared. The active material is formed into a single layer or multilayered structure that is preferably porous. The stream containing substance that needs to be transformed is exposed to the active material structure while charge flow is induced by the applied electromagnetic field. Where appropriate, the product stream is collected after such exposure.

In a related aspect, the invention comprises a method of manufacturing a device comprising an active material preferably with high band gap (preferably greater than 0.5 eV, more preferably 1.5 eV, most preferably 2.5 eV). The active material is preferably provided a high surface area form such as a nanostructured material or a nanocomposite or a high internal porosity material. A porous structure comprising at least one layer, such as a thin film layer, of the active material and electrodes positioned on the at least one layer to enable an electromagnetic field to be applied across the at least one layer. It is preferred that the resistance of the device between the electrodes be between 0.001 milliohm to 100 megaohm per unit ampere of current flowing through the device, more preferably between 0.01 milliohm to 10 megaohm per unit ampere of current flowing through the device, and most preferably 1 milliohm to 1 megaohm per unit ampere of current flowing through the device.

In case the current flow measure is not known or difficult to measure, it is preferred that the corresponding power consumption levels for the device be used to practice this invention. To illustrate, in case of electromagnetic field is externally applied, then it is preferred that the power consumption due to device operation be between 0.001 milliwatt to 100 megawatt. While miniature, thin film, and micromachined devices may utilize power less than these and applications may use power higher than these levels, and such applications are herewith included in the scope of this invention, in all cases, design and/or operation that leads to lower power requirement is favored to minimize the operating costs by the device. Higher resistances may be used when the chemical transformation step so requires. In case, alternating current is used, the overall impedance of the device must be kept low to reduce energy consumption and operating costs. Once again, the yield, the selectivity, the operating costs and the capital costs of the device must be considered in designing, selecting, and operating the device.

In another aspect, the present invention provides methods to efficiently provide localized thermal or potential energy at the surface of a catalyst. Additionally, the present invention offers a method of reducing or preventing the need for external thermal energy input.

In yet another aspect, the present invention provides methods for the preparation of a device for chemically transforming a species through the use of electromagnetic field. Additionally, the present invention describes products prepared using such devices for chemically transforming a species with electromagnetic field. In another aspect, the present invention describes applications of novel fluid and chemical composition transformation technique.

METHOD OF OPERATION

The device is operated by placing the active material in a direct current or alternating current electrical circuit that leads to flow of charge. The charge flow can be through flow of electrons, flow of ions, or flow of holes. In one embodiment, it is preferred that during operation, the circuit be switched on first such that charges begin to flow in the circuit. Next, feed material is exposed to the active material for duration desired and the products resulting from such exposure are collected. In another embodiment it is preferred that the feed material be in contact with the active material catalyst first, next the flow of charge is initiated by switching on the electrical circuit. In yet another embodiment, the circuit is switched on to induce flow of charge that initiates the desired reaction which is then followed by changing the electromagnetic field that best favors the performance of the catalyst, the yield, the selectivity, the operating costs and the capital costs of the device. In another embodiment, the circuit is operating in a time varying or pulsating or pre-programmed switching on and off of the electrical circuit to induce corresponding flow of charge through the active material.

In one or more embodiments, the device may be cooled or heated using secondary sources, pressurized or evacuated using secondary sources, photonically and optically activated or isolated using secondary sources, laser activated or field influenced using secondary sources, gas, liquid, solid, ion, or energy influenced using secondary sources. The device may be heated or cooled to desired temperature through resistive or convective or radiative heating for illustration, pressurized or evacuated to desired pressure through piezo effects for illustration, photonically and optically activated to desired photonic influence through phosphorescence affects for illustration. The device may assist such functions by design through the use of the electrical current directly, i.e. the current affects the catalyst and also enables such desired state variables. The device may be free standing or fully supported or partially supported. The device may be operated in steady state, unsteady state, pulsed mode, continuous or batch mode, symmetric waveforms, asymmetric waveforms, in motion or in stationary state.

BRIEF DESCRIPTION OF THE DRAWINGS

FIG. 3 shows a flow diagram of major steps in a process in accordance with the present invention;

DETAILED DESCRIPTION OF THE PREFERRED EMBODIMENTS

Figure 2:
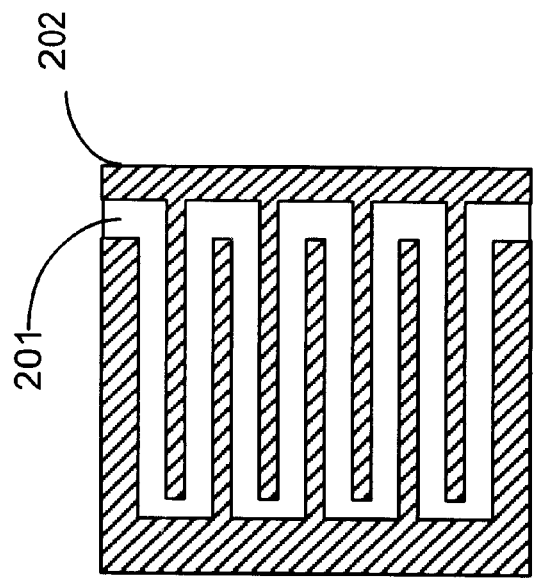
FIG. 2 shows a schematic view of a preferred alternative chemical transformation device in accordance with the present invention.

The present invention involves all phases of catalytic processing including devices for performing catalytic processing, methods of making devices for catalytic processing, and methods for operating devices to perform catalytic processing. The present invention is described in terms of several specific examples but it is readily appreciated that the present invention can be modified in a predictable manner to meet the needs of a particular application. Except as otherwise noted herein, the specific examples shown herein are not limitations on the basic teachings of the present invention but are instead merely illustrative examples that aid understanding.

Specific examples in this specification involve application of nanomaterial catalysts in thin films that are self-supporting or supported by membranes or substrates. This technique in accordance with the present invention reduces the thermal mass of the catalytic system comprising the catalyst and its supporting structure. It has been found that catalytic behavior is significantly enhanced by procedures and structures that reduce the system's thermal mass while increasing surface area of the catalyst. The specification suggests reasons why the various examples behave in the manner observed, however, these explanations provided to improve understanding are not to be construed as limitations on the teachings of the present invention.

In some of the examples given herein, the induced flow of charge results in localized phenomena such as localized increase and/or decrease in charge flow or localized electric field variations and/or localized heating within the nanomaterial film. The local areas in which these phenomena are concentrated are called "hot spots". Hotspots correspond to local areas of high catalytic activity. The localized phenomena result from random or intentionally created variations in the nanomaterial film, for example, that restrict or concentrate current flow, electric field, phonon interaction, thermal energy, or the like. It has been observed that in some applications hotspots, once created, can sustain catalytic activity in the absence of an externally applied electromagnetic field.

The present invention is described using terms of defined below:

"Catalysis," as the term used herein, is the acceleration of any physical or chemical or biological reaction by a small quantity of a substance—herein referred to as "catalyst"—the amount and nature of which remain essentially unchanged during the reaction. Alternatively, the term, includes applications where the catalyst can be regenerated or its nature essentially restored after the reaction by any suitable means such as but not limiting to heating, pressure, oxidation, reduction, and microbial action. For teachings contained herein, a raw material is considered catalyzed by a substance into a product if the substance is a catalyst for one or more intermediate steps of associated physical or chemical or biological reaction.

"Chemical transformation," as the term used herein, is the rearrangement, change, addition, or removal of chemical bonds in any substance or substances such as but not limiting to compounds, chemicals, materials, fuels, pollutants, biomaterials, biochemicals, and biologically active species. The terms also includes bonds that some in the art prefer to not call as chemical bonds such as but not limiting to Van der Waals bonds and hydrogen bonds.

"Nanomaterials," as the term is used herein, are substances having a domain size of less than 250 nm, preferably less than 100 nm, or alternatively, having a domain size sufficiently small that a selected material property is substantially different (e.g., different in kind or magnitude) from that of a micron-scale material of the same composition due to size confinement effects. For example, a property may differ by about 20% or more from the same property for an analogous micron-scale material. In case the domain size is difficult to measure or difficult to define such as in porous networks, this term used herein refers to substances that have interface area greater than 1 square centimeter per gram of the substance. The ratio of the maximum domain dimension to minimum domain dimension in the catalyst for this invention is greater than or equal to 1. The term nanomaterials includes coated, partially coated, fully coated, island, uncoated, hollow, porous, and dense domains. Furthermore, nanomaterials may be produced by any method to practice this invention.

"Domain size," as the term is used herein, is the minimum dimension of a particular material morphology. The domain size of a powder is the grain size. The domain size of a whisker or fiber is the diameter, and the domain size of a film or plate is the thickness.

"Confinement size" of a material, as the term is used herein in reference to a fundamental or derived property of interest, is the mean domain size below which the property becomes a function of the domain size in the material.

"Activity" of a catalyst, as the term used herein, is a measure of the rate of conversion of the starting material by the catalyst.

"Selectivity" o f a catalyst, as the term used herein, is a measure of the relative rate of formation of each product from two or more competing reactions. Often, selectivity of a specific product is of interest, though multiple products may interest some applications.

"Stability" of a catalyst, as the term used herein, is a measure of the catalyst's ability to retain useful life, activity and selectivity above predetermined levels in presence of factors that can cause chemical, thermal, or mechanical degradation or decomposition. Illustrative, but not limiting, factors include coking, poisoning, oxidation, reduction, thermal run away, expansion-contraction, flow, handling, and charging of catalyst.

"Porous" as used herein means a structure with sufficient interstitial space to allow transport of reactant and product materials within the structure to expose the reactant materials to the constituent compositions making up the porous structure.

Figure 1:
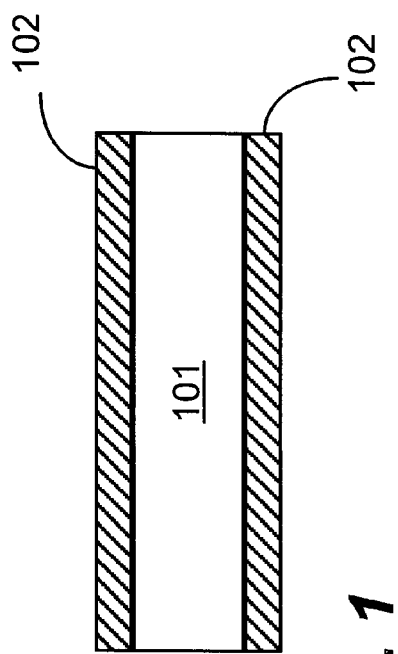
FIG. 1 shows a schematic view of a chemical transformation device in accordance with the present invention.

FIG. 1 illustrates an embodiment of the present invention in its most basic form. Essentially, an active layer 101 is sandwiched between two electrodes 102. Active layer 101 comprises a material that either as applied or as later modified by postprocessing acts as a catalyst for to convert a particular feed composition into a desired product composition. The dimensions and geometry of active layer 101 are selected to provide both sufficient exposure to a feed composition (i.e., a composition that is to be catalyzed) and to allow an impeded current flow between electrodes 102 when an electromagnetic field is applied across electrodes 102.

Although specific examples of materials suitable for active layer 101 are set out below, active layer 101 more generally comprises a material that is an active catalyst for a desired reaction when activated by an applied electric field. The properties of active layer 101 are selected to allow active layer 101 to both support an electric field and conduct current. It is not necessary that active layer 101 be active as a catalyst at ambient conditions. However, in some embodiments, the active layer 101 may have catalytic activity in ambient or non-ambient conditions even when an electric field is not applied between electrodes 102.

FIG. 2 illustrates a preferred alternative configuration in which electrodes 202 and active layers 201 are arranged in a multilayer or interdigitated structure. The structure shown in FIG. 2 provides greater interface area between electrodes 202 and active layers 201 as compared to the embodiment shown in FIG. 1. The structures shown in FIG. 1 and FIG. 2, as well as other structural variants that enable the electrode-active layer interaction described herein, are considered equivalent for purposes of the present invention unless specifically indicated otherwise.

In case the resistive component between electrodes 202 is the mechanistic impedance limiting the performance of the device, the parallel multilayer structure shown in FIG. 2 can reduce the impedance of the chemical transformation device in accordance with the present invention. The individual active layers 101 or electrodes can be the same or different formulation. It is contemplated that one or more active layers 101 may be replaced by a material capable of a secondary but desired function. For example, one active layer 101 can be replaced with a resistive composition by design to provide heat to the device. In some embodiments it may be desirable to have one or more active layers replaced with EMI (electromagnetic interference) filter layers to shield or affect the active layer from inductively or capacitively coupling with the environment. In another embodiment, one of the layers can be air or an insulating layer in order to provide thermal isolation to the active layer. In yet another embodiment, sensing layers may be provided to sense the concentration of one or more species in the feed or processed or recycle stream. In yet another embodiment, electrochemical couple layers may be provided to internally generated electricity and energy needed to satisfactorily operate the device. In other embodiments, the electrode layers can function as anodes and cathodes. In some embodiments, the device may be a minor part of the multilaminate device and the device containing device can have primary function of reliably providing an electrical, thermal, magnetic, electromagnetic, optical, or structural function in an application. The active layer can also comprise multilaminates of different material formulations.

A method for preparing a chemical composition transformation device in accordance with the present invention involves selecting an active material comprising a surface that physically, chemically, or biologically interacts with the substance that is desired to be transformed or with one of the intermediates of such substance. The active material is prepared in a high surface area form (i.e., a form that exhibits a surface area of preferably greater than 1 square centimeter per gram, more preferably 100 square centimeter per gram, and most preferably 1 square meter per gram). It is believed that the present invention is enhanced by the interaction between the surface area of particles making up the active layer 101 and the applied electromagnetic field. Accordingly, a higher surface area form tends to increase desirable catalytic behavior for a given quantity of material.

FIG. 3 illustrates basic steps in an exemplary process for manufacturing a catalytic device in accordance with the present invention. The active material, usually prepared as a powder or powder mixture in step 301 and then optionally blended with additional compositions to form, a slurry, ink or paste for screen printing in step 305. In step 305 the active material is directly or alternatively formed into a film, pellet, or multilayer structure comprising the active material. The film, pellet, or multilayer structure may be prepared as free standing or on a substrate.

The active layer structure may be porous or the structure may be non-porous. It is preferred that the device be porous to reduce pressure drop and enhance contact of the active element with the chemical species of interest. Table 1 lists some catalysts and pore size ranges to illustrate but not limit the scope:

TABLE 1

Catalyst Types and Pore Sizes

| (1) Catalyst | Average Pore Radius (Å) |
|---|---|
| Activated carbons | 10–20 |
| Silica gels | 15–100 |
| Silica-alumina cracking catalysts ~ 10–20% $Al_2O_3$ | 15–150 |
| Silica-alumina (steam deactivated) | 155 |
| Silica-magnesia microsphere: | |

TABLE 1-continued

Catalyst Types and Pore Sizes

| (1) Catalyst | Average Pore Radius (Å) |
|---|---|
| Nalco, 25% MgO | 14.3 |
| Da-5 silica-magnesia | 11.1 |
| Activated clays | ~100 |
| TCC clay pellets (MgO, CaO, $Fe_2O_3$, $SO_4$) = ~10% | 26.3 |
| Clays: | |
| Montmorrillonite (heated 550° C.) | 25.2 |
| Vermiculite | ~314 |
| Activated alumina (Alorico) | 45 |
| CoMo on alumina | 20–40 |
| Kieselguhr (Celite 296) | 11,000 |
| Fe-synthetic $NH_3$ catalyst | 200–1000 |
| $Co$-$ThO_2$-Kieselguhr> 100:18:100 (reduced) pellets | 345 |
| $Co$-$ThO_2$-MgO (100:6:12) (reduced) granular | 190 |
| Co-Kieselguhr 100:200 (reduced) granular | 2030 |
| Porous plate (Coors No. 760), Pumice, Fused Copper Catalyst, Ni Film, NI on Pumice | 2150 |

In other embodiments, the structure may be smooth or wavy, flexible or rigid, homogeneous or heterogeneous, undoped or doped, flat or cylindrical or any other shape and form, nanostructured or non-nanostructured. In all cases, this invention prefers that the material compositions chosen be physically robust in presence of all species in its environment in particular and all environmental variables in general for a duration equal to or greater than the desired life for the device. In all cases, this invention requires that the material selected has a finite impedance in the presence of electromagnetic field.

Once a suitable material composition has been selected for use in the chemical composition transformation device, in one embodiment, namely the formation of a chemical composition transformation device, a disc or body or single active layer laminated stack structure (as shown in FIG. 1) is formed, or in another embodiment a multilayer structure (as shown in FIG. 2) is formed in step 305 from the selected active material.

The active material layer formed in step 305 or structure or device form can be formed by any method or combination of methods, including but not limited to spin coating, dip coating, surface coating a porous structure, powder pressing, casting, screen printing, tape forming, precipitation, sol-gel forming, curtain deposition, physical sputtering, reactive sputtering, physical vapor deposition, chemical vapor deposition, ion beam, e-beam deposition, molecular beam epitaxy, laser deposition, plasma deposition, electrophoretic deposition, magnetophoretic deposition, thermophoretic deposition, stamping, cold pressing, hot pressing, explosion, pressing with an additive and then removal of the additive by heat or solvents or supercritical fluids, physical or chemical routes, centrifugal casting, gel casting, investment casting, extrusion, electrochemical or electrolytic or electroless deposition, screen-stencil printing, stacking and laminating, brush painting, self-assembly, forming with biological processes, or a combination of one or more of the above-mentioned methods.

The active material can be in film form or dispersed particle form or bulk form or wire form. The cross section area of the active material structure can be few microns square to thousands of meters square depending on the needs of the application. In a preferred embodiment, the active material can also be doped with available promoters and additives to further enhance the device's performance. In another preferred embodiment, the active material can also be mixed with inert elements and compositions and insulating formulations to further reduce capital or operating costs such as those from raw materials and pressure drop.

In a preferred embodiment, the catalyst is applied in a form and structure that minimizes the thermal mass of the system. In this regard, the catalyst and any supporting substrate(s) are considered components of the system. A given system's effectiveness is related to the surface area of catalyst that participates in the reaction. Thin film or thick film catalyst layers provide large surface area compared to bulk or pellet forms using a smaller amount of catalyst.

Figure 6:
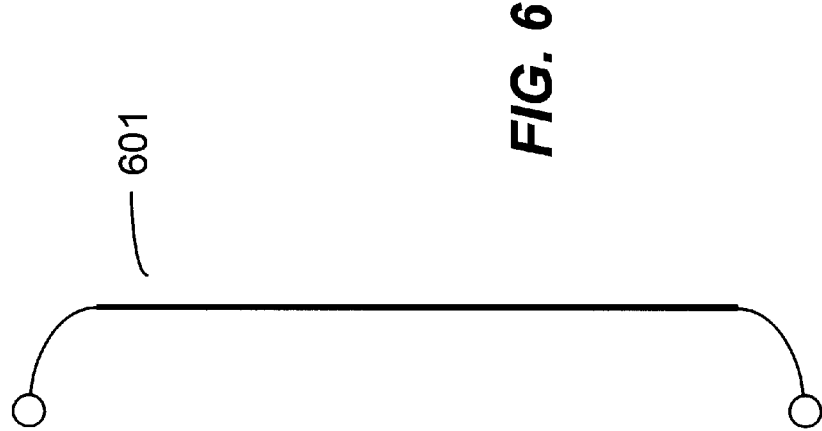
FIG. 6 shows an alternative embodiment structure for a chemical transformation device in accordance with the present invention.
Figure 5:
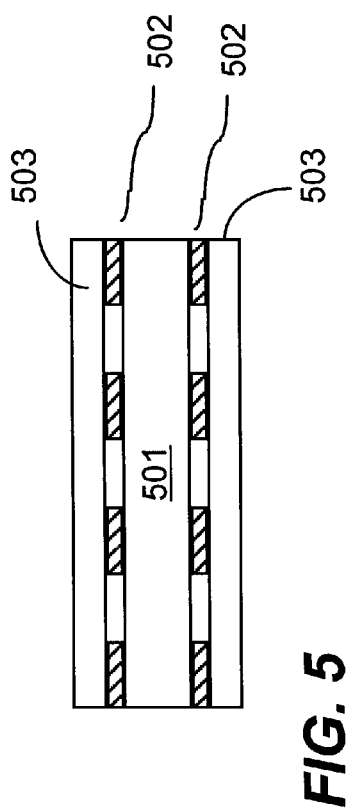
FIG. 5 illustrates a thin film implementation in accordance with the present invention.
Figure 7:
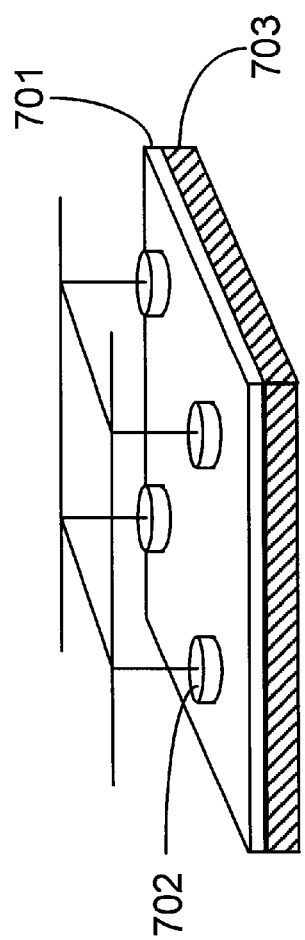
FIG. 7 illustrates another alternative embodiment structure for chemical transformation device in accordance with the present invention.

FIG. 1 generally illustrates a thick film or thin film implementation. FIG. 5 shows a specific implementation in which a substrate 501 such as a ceramic or glass slide, for example, that supports patterned electrodes 502 and active layer or layers 503. FIG. 6 shows an example in which the active layer 601 is self supporting, or supported by a thin membrane rather than a substrate 501. In each case, the system is implemented to provide substantial surface area exposure of the active layer 601 while providing a low thermal mass for the entire system.

In contrast to bulk or pellet catalyst shapes, thin film catalyst layers reduce the mass of catalyst needed which can reduce the capital cost of catalyst. Furthermore, it is preferred that the phonon pathways be minimized to reduce heat loss. One method of accomplishing this is to coat any and all surfaces of a substrate (for example, both major surfaces of a flat substrate 501). These techniques reduce the electrical energy needed to keep the catalyst at a given temperature and given operating condition. Less thermal mass and smaller area for conductive or convective or radiative thermal transport can decrease the cost of electrical energy needed for given yield or selectivity.

Another technique for reducing thermal mass is to minimize the mass of the supporting substrate(s). This can be done, for example, by forming a free-standing membrane from the catalyst material such as shown in FIG. 6. In other cases, reducing the substrate's thickness or heat capacity can help achieve this goal. In yet other cases, porous substrates or composites can help achieve these goals by providing greater surface area with which to coat with the catalyst. These techniques in accordance with the present invention are useful in applications in which it is desirable to reduce the amount of energy input per unit product produced, and correspondingly reduce the cost, complexity, and overhead associated with higher input energy systems.

In another embodiment, the catalyst 701 is applied as a film with predefined areas or spots 702 that can provide localized heating. Electric current is used to locally heat by passing current between spots 702 and a conductive backplane 703 such that the predefined areas heat to a temperature that triggers the desired reaction, or to otherwise create local conditions in the region of the predefined areas that favor the start of the desired reaction. Once the reaction begins, the electric current is maintained, or reduced, or continuously or periodically shut off to reduce operating costs. The chemical transformation is allowed to continue with the assistance of or in the presence of the localized heating. Convective or forced gas flows, turbulent or laminar gas flow, insulation, pre-heating, external energy input may be applied to maintain the catalytic surface at conditions that favor the desired economics and product distribution.

In another preferred embodiment, the active layer comprises functional materials such as those that provide thermal, sensing, pressure, charge, field, photons, structural, regeneration or other needed functions. Secondary treatments of the active material through sintering, pressurization, doping, chemical reactions, solid state reaction, self propagating combustion, reduction, oxidation, hydrogenation, and such treatments may enhance the performance of the active layer.

Possible compositions of the active material include but are not limited to one or more of the following materials: dielectrics, ferrites, organics, inorganics, metals, semimetals, alloy, ceramic, conducting polymer, non-conducting polymer, ion conducting, non-metallic, ceramic-ceramic composite, ceramic-polymer composite, ceramic-metal composite, metal-polymer composite, polymer-polymer composite, metal-metal composite, processed materials including paper and fibers, and natural materials such as mica, percolated composites, powder composites, whisker composites, or a combination of one or more of these. Illustrative formulations include but are not limited to doped or undoped, stoichiometric or non-stoichiometric alloy or compound of s-, p-, d-, and f-group of periodic table. Illustrative compositions that can be utilized in this invention as is or on substrates include one-metal or multi-metal oxides, nitrides, carbides, borides, indium tin oxide, antimony tin oxide, rare earth oxides, silicon carbide, zirconium carbide, molybdenum carbide, bismuth telluride, gallium nitride, silicon, germanium, iron oxide, titanium boride, titanium nitride, molybdenum nitride, vanadium nitride, zirconium nitride, zirconium boride, lanthanum boride, iron boride, zirconates, aluminates, tungstates, carbides, silicides, borates, hydrides, oxynitrides, oxycarbides, carbonitrides, halides, silicates, zeolites, self-assembled materials, cage structured materials, fullerene materials, nanotube materials, phosphides, nitrides, chalcogenides, dielectrics, ferrites, precious metals and alloys, non-precious metals and alloys, bimetal and polymetal systems, ceramics, halogen doped ceramics (such as, but not limiting to fluorine doped tin oxide), stoichiometric or non-stoichiometric compositions, stable and metastable compositions, dispersed systems, dendrimers, polymers, enzymes, organometallics, bioactive molecules, and mixtures thereof. Some specific, but not limiting, examples are listed in Table 2A, 2B, and 2C.

TABLE 2A

Illustrative Metals and Semimetals

| | | | |
|---|---|---|---|
| Ru | Rh | Pd | Ag |
| Os | Ir | Pt | Au |
| Re | W | Zn | Hg |
| Fe | Co | Ni | Cu |
| Pb | Bi | Sb | Sn |
| Te | Se | As | Cd |
| Mo | Ti | Zr | Ce |

TABLE 2B

Illustrative Alloys

| Catalyst | Added Metal to Form Alloy | Illustrative Reaction |
|---|---|---|
| Pt | 5–20% Rh | ammonia oxidation |
| Ag | Au | ethylene oxidation |
| Ag | 10% Au | cumene oxidation |
| Pt | Ce, Sn, In, Ga | dehydrogenation and cracking of alkanes |
| Pt | Sn + Re | dehydrocycilization and aromatization of alkanes |
| Pt | Pb, Cu | dehydrocycilization and aromatization of alkanes |
| Pt, Pd, Ir | Au | oxidative dehydrogenation of alkanes; n-butene $d_3$ butadiene, methanal $d_3$ formaldehyde |
| Ru, Os | Cu (Ag) | catalytic reforming |
| Ir | Au (Ag, Cu) | catalytic reforming of alkanes and cycloalkanes |
| Pd | | alkaned dehydrogenation and dehydrocyclization |

TABLE 2C

Illustrative Oxide Ceramics

| | | | |
|---|---|---|---|
| CaO, SrO, BaO | $WO_3, UO_3$ | $NiO, Cu_2O, CuO$ | $HgO, PbO_2, Bi_2O_5$ |
| $Al_2O_3, SiO_2, P_2O_5$ | $Ta_2O_5, HfO_2$ | $FeO, CoO, Co_3O_4,$ | $Cr_2O_3, MnO, Fe_3O_4$ |
| $BeO, B_2O_3, MgO$ | $Nb_2O_5, MoO_3$ | $CdO, SnO_2, Sb_2O_5,$ | $ZnO, GeO_2, As_2O_5$ |
| $Al_2O_3$—$SiO_2$ | $HfO_2, Fe_2O_3$ | $ZrO_2$—$SiO_2$ | $Sc_2O_3, TiO_2$ |
| $BeO$—$SiO_2$ | $ZrO_2, V_2O_5$ | $Y_3O_3$—$SiO_2$ | $La_2O_3$—$SiO_2$ |
| $Ga_2O_3$—$SiO_2$ | $MgO$–$SiO_2$ | $SnO_3$—$SiO_2$ | $Sb_3O_3$—$SiO_2$ |

Additionally, the formed active layer 101 can be porous or non-porous, flat or tapered, uniform or non-uniform, planar or wavy, straight or curved, non-patterned or patterned, micron or sub-micron, micromachined or bulk machined, grain sized confined or not, homogeneous or heterogeneous, spherical or non-spherical, unimodal or polymodal, or a combination of one or more of these.

In a preferred embodiment, the electrode structures formed in steps 307 and 309 and illustrated in FIG. 1 and FIG. 2 as 102 and 202, may comprise any composition with a lower impedance than the active material composition. The composition of the electrode layer can include, but is not limited to, organic materials, inorganic materials, metallic, alloy, ceramic, polymer, non-metallic, ceramic-ceramic composite, ceramic-polymer composite, ceramic-metal composite, metal-polymer composite, polymer-polymer composite, metal-metal composite, or a combination of one or more of these. Geometries may be porous or dense, flat or tapered, uniform or non-uniform, planar or wavy, straight or curved, non-patterned or patterned, micron or sub-micron, grain size confined or not, or a combination of one or more of these.

In the exemplary implementation outlined in FIG. 3, electrodes 102 and 202 are formed by available press/coat/mask/print techniques in step 309 followed by formation of green electrode layer(s) using, for example, printing techniques. Alternative methods of forming the electrode layers 102 and 202 include any method including but not limited to spin coating, dip coating, surface coating a porous structure, powder pressing, casting, screen printing, tape forming, curtain deposition, physical sputtering, reactive sputtering, physical vapor deposition, chemical vapor deposition, ion beam, e-beam deposition, molecular beam epitaxy, laser deposition, plasma deposition, electrophoretic deposition, magnetophoretic deposition, thermophoretic deposition, stamping, cold pressing, hot pressing, pressing with an additive and then removal of the additive by heat or solvents or supercritical fluids, physical or chemical routes, placing metal plates or films on certain parts of the active material, inserting wire, chemically transforming section in the active layer, centrifugal casting, gel casting, investment casting, extrusion, electrochemical deposition, screen-stencil printing, stacking and laminating, brush painting, self-assembly, forming with biological processes, or a combination of one or more of the above-mentioned methods.

After preparation of the stack, the stack may for some applications be cut cross sectionally into thin slices in step 313 to expose the layers of the active layer and the electrode. In another embodiment, one or more of step 307, step 309, and step 313 may be skipped. In such cases, it is necessary that the equipment containing the catalytic device provide external electrodes or equivalent means in some form to enable the flow of charge through the active material. Finally, given the catalytic properties of the active layer, some of the steps in FIG. 3 may be assisted or accomplished through the use of said catalytic properties.

Figure 4:
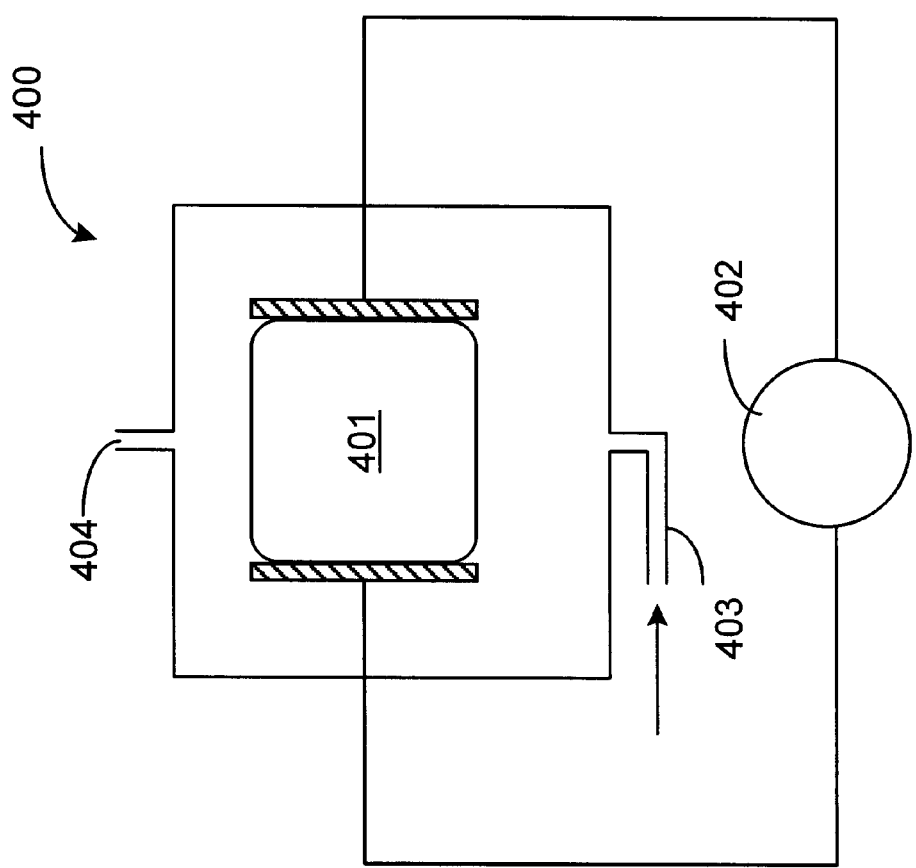
FIG. 4 shows a schematic view of a chemical transformation reactor in accordance with the present invention.

Each slice obtained from step 313 in FIG. 3 is a device that can be used in a circuit shown as FIG. 4 to transform one or more species in a gas, vapor, liquid, supercritical fluid, solid or a combination of these. In step 315 the stack is calcined or sintered to reach structural robustness, consistency, and performance in the active material and green electrode layers.

In one embodiment, the device is terminated by forming an electrical coupling to electrodes 102, 202 in step 317 enabling application of an external electrical field. In a preferred embodiment, it is desirable that the active material and the electrode layers be isolated from external environmental damage such as that from thermal, mechanical, chemical, electrical, magnetic, or radiation effects, or a combination of one or more of these. This desired protection may be achieved in step 317 by providing a conformal covering (not shown) over the layers on the unexposed surfaces, such as an polymer conformal protective layer. In another preferred embodiment, the exposed surface may also be isolated from external thermal, mechanical, chemical, electrical, magnetic, or radiation damage by covering with a layer of ceramic or porous rigid material mesh. In yet another preferred embodiment, the exposed surface may be covered with a layer that enhances the selectivity of the feed species reaching the active surface. Such a layer can include, but is not limited to, polymers, metals, zeolites, self-assembled materials, or porous media, each of which has a higher permeability for the analyte of interest and a lower permeability for other species that are not of interest. In some preferred embodiments the exposed surface is covered with polymers such as but not limiting to polyethylene, polypropylene, teflon, polycarbonates, or polyaromatics. However, it is generally preferable that any covering on the exposed surface does not impede the interaction of the analyte or analytes to be transformed with the active layer by an amount greater than the species that are not of interest. Exceptions to this general rule may be made in certain cases, for example, when it is critical to protect the element from destructive effects of the environment. In another embodiment, steps 317 and 319 may be skipped.

FIG. 4 shows an exemplary chemical transformation system or reactor 400 in using the chemical transformation processes and devices in accordance with the present invention. The reactor 400 shown in FIG. 4 is notable for its simplicity due to the fact that high pressures and high temperatures are not required because of the superior performance of transformation device 401 in accordance with the present invention. The electrodes of device 401 are coupled in a circuit with power supply 402 so as to supply an electromagnetic field between the opposing electrodes of device 401. The circuit shown in FIG. 4 is illustrative; it may be replaced with any suitable circuit that can provide a flow of charge, internally (such as but not limiting to ohmic or ion flow or hole flow based current) or externally (such as but not limiting to eddy current or induced current from applied electromagnetic field) or both, in a given application.

Power supply 402 may supply direct current, alternating current, or any other form of electromagnetic waveform. The charge may be induced to flow in the device when the device is wired or through the use of wireless techniques.

The device 401 may include a single device such as shown in FIG. 1 and FIG. 2 or an array of elements such as shown in FIG. 1 and FIG. 2. The electrodes of the device(s) 401 may alternatively provide means to connect the device to induce interaction with an externally induced field such as but not limited to radio frequency or microwave frequency waves, or the equivalent.

Reactor 400 includes an inlet port 403 for receiving a feed stream and an outlet 404 producing a reactant stream. In operation, feed gas or liquid passes in contact with device 401 while power supply 402 is active and is transformed before passing from outlet 404. Device 401 shown in FIG. 4 may be placed in reactor 400 in various ways to manufacture and practice useful equipment such as, but not limiting to, obstrusive or non-obstrusive manner, as randomly or periodically arranged packed bed, with or without baffles to prevent short circuiting of feed, in open or closed reactors, inside pipes or separately designed unit, with accessories such as mixers, in a system that favors laminar or plug or turbulent or no flow, sealed or unsealed, isolated or non-isolated, heated or cooled, pressurized or evacuated, isothermal or non-isothermal, adiabatic or non-adiabatic, metal or plastic reactor, straight flow or recycle reactor, co-axial or counter-axial flow, and reactor or array of reactors that is/are available.

Table 3 lists example reactor technologies that may be used in accordance with the present invention. To illustrate the scope without limiting it, some examples from the art are listed in Table 3 and some in Kirk-Othmer Encyclopedia of Chemical Technology, Reactor Technology, John Wiley & Sons, Vol 20, pp 1007–1059 (1993) which is hereby incorporated by reference.

TABLE 3

Illustrative reactor designs

| | | |
|---|---|---|
| Stirred Tank | Tubular | Tower |
| Fluidized Bed | Batch | Continuous |
| Packed Bed | Film | Recycle |
| Plug Flow | Semibatch | Non-ideal |
| Membrane | Bioreactor | Multistage |

Applications

The method and techniques disclosed can be applied to prepare catalysts and devices in manufacturing of useful chemicals and drugs. The superior performance of the method and device proposed for chemical composition transformation may be used to produce intermediates or final products. Some illustrative, but not limiting reaction paths where this invention can be applied are listed in Table 4. Reactions that utilize one or more elementary reaction paths in Table 4 can also benefit from the teachings herein. The benefits of such applications of teachings are many. To illustrate but not limit, the near ambient condition operation can reduce the cost and ease the ability to control chemical synthesis; it can in some cases lesser levels of thermal shocks during start ups and shut downs can enhance the robustness of the catalysts. In general the invention can be applied to produce useful materials from less value added materials, readily available raw materials, or waste streams.

TABLE 4

| | | |
|---|---|---|
| $A + s \leftrightarrow As$ | $2A + s \leftrightarrow A_2s$ | $A + 2s \leftrightarrow 2A_{\frac{1}{2}}s$ |
| $As \leftrightarrow Rs$ | $A_2s + s \leftrightarrow 2As$ | $2A_{\frac{1}{2}}s \leftrightarrow Rs + s$ |
| $Rs \leftrightarrow R + s$ | $As \leftrightarrow Rs$ | $Rs \leftrightarrow R + s$ |
| | $Rs \leftrightarrow R + s$ | |
| $A + s \leftrightarrow As$ | $A + s \leftrightarrow As$ | $A + s \leftrightarrow As$ |
| $As + s \leftrightarrow Rs + Ss$ | $As \leftrightarrow Rs + S$ | $B + s \leftrightarrow Bs$ |
| $Rs \leftrightarrow R + s$ | $Rs \leftrightarrow R + s$ | $As + Bs \leftrightarrow Rs + s$ |
| $Ss \leftrightarrow S + s$ | | $Rs \leftrightarrow R + s$ |
| $A + s \leftrightarrow As$ | $A + 2s \leftrightarrow 2A_{\frac{1}{2}}s$ | $B + s \leftrightarrow Bs$ |
| $B + s \leftrightarrow Bs$ | $B + s \leftrightarrow Bs$ | $A + Bs \leftrightarrow Rs + S$ |
| $As + Bs \leftrightarrow Rs + Ss$ | $2A_{\frac{1}{2}}s + Bs \leftrightarrow Rs +$ | $Rs \leftrightarrow R + s$ |
| $Rs \leftrightarrow R + s$ | $Ss + s$ | |
| $Ss \leftrightarrow S + s$ | $Rs \leftrightarrow R + s$ | |
| | $Ss \leftrightarrow S + s$ | |

One of the significant commercially important application of this invention is in providing candidates to and in improving the performance of catalysis science and technology. This is particularly desirable for existing precious-metal and non-precious metal based catalytic formulations, heterogeneous and homogeneous catalysis, and for catalytic applications such as but not limiting to those and as known in the art and which are herewith included by reference. To illustrate the scope without limiting it, some examples where this invention can be applied are listed in Tables 5A, 5B, 5C, 5D, 5E, 5F and some are listed in the art such as Kirk-Othmer Encyclopedia of Chemical Technology, Catalysis, John Wiley & Sons, Vol. 5, pp. 320–460 (1993) and references contained therein.

TABLE 5A

ILLUSTRATIVE APPLICATIONS

| Catalyst | Reaction |
|---|---|
| metals (e.g., Ni, Pd, Pt, as powders or on supports) or metal oxides (e.g., $Cr_2O_3$) | C=C bond hydrogenation (e.g., olefin + $H_2$ $d_3$ paraffin) |
| metals (e.g., Cu, Ni, Pt) | C=O bond hydrogenation (e.g., acetone + $H_2$ $d_3$ 2-propanol) |
| metal (e.g., Pd, Pt) | Complete oxidation of hydrocarbons, oxidation of CO |
| Fe, Ru (supported and promoted with alkali metals) | $3 H_2 + N_2 \rightarrow 2 NH_3$ |
| Ni | $CO + 3 H_2 \rightarrow CH_4 + H_2O$ (methanation) $CH_4 + H_2O \rightarrow 3 H_2 + CO$ (steam reforming) |
| Fe or Co (supported and promoted with alkali metals) | $CO + H_2 \rightarrow$ paraffins + olefins + $H_2O + CO_2$ (+ oxygen-containing organic compounds) (Fischer-Tropsch reaction) |
| Cu (supported on ZnO, with other components, e.g., $Al_2O_3$) | $CO + 2 H_2 \rightarrow CH_3OH$ |
| Re + Pt (supported on $Al_2O_3$ and promoted with chloride) | paraffin dehydrogenation, isomerization and dehydrocyclization (e.g., heptane $\rightarrow$ toluene + 4 $H_2$) (naphtha reforming) |
| solid acids (e.g., $SiO_2$—$Al_2O_3$, zeolites) | paraffin cracking and isomerization; aromatic alkylation; polymerization of olefins |
| $Al_2O_3$ | alcohol $\rightarrow$ olefin + $H_2O$ |
| Pd supported on zeolite | paraffin hydrocracking |
| metal-oxide-supported complexes of Cr, Ti, or Zr | olefin polymerization (e.g., ethylene $d_3$ polyethylene) |
| metal-oxide-supported complexes of W or Re | olefin metathesis (e.g., 2 propylene $d_3$ ethylene + butene) |
| Catalyst | Reaction |
| $V_2O_5$ or Pt | $2 SO_2 + O_2 \rightarrow 2 SO_3$ |
| $V_2O_5$ (on metal-oxide support) | naphthalene + 9/2 $O_2$ $\rightarrow$ phthalic anhydride + 2 $CO_2$ + 2 $H_2O$ o-xylene + 3 $O_2$ $\rightarrow$ phthalic anhydride + 3 $H_2O$ |
| Ag (on inert support, promoted by alkali metals) | Ethylene + ½ $O_2$ $\rightarrow$ ethylene oxide (with $CO_2$ + $H_2O$) |
| bismuth molybdate, uranium antimonate, other mixed metal oxides | propylene + ½ $O_2$ $d_3$ acrolein propylene + 3/2 $O_3$ + $NH_3$ $d_3$ acrylonitrile + 3 $H_2O$ |
| mixed oxides of Fe and Mo | $CH_3OH + O_2$ $d_3$ formaldehyde (with $CO_2$ and $H_2O$) |
| Fe3O4 or metal sulfides | $H_2O + CO$ $d_3$ $H_2 + CO_2$ (water gas shift reaction) |
| Co—Mo/$Al_2O_3$ (S) and Ni—Mo/$Al_2O_3$ (S) and Ni—W/$Al_2O_3$ (S) | olefin hydrogenation, aromatic hydrogenation hydrodesulfurization, hydrodenitrogenation |

TABLE 5B

ILLUSTRATIVE APPLICATIONS

| Catalyst | Industry process |
|---|---|
| | Hydrogen, carbon monoxide, methanol, and ammonia |
| ZnO, activated C | Feed pretreatment for reforming |
| supported Ni, | Reforming |
| Cr-promoted Fe | Shift reaction |
| CuO—ZnO—$Al_2O_3$ supported Ni | Methanation |
| promoted Fe | Ammonia synthesis |
| Cu—Cr—Zn oxide, Zn chromite | Methanol synthesis |
| | Hydrogenation |
| 25% Ni in oil | Edible and inedible oil |
| activated Ni | Various products |

TABLE 5B-continued

ILLUSTRATIVE APPLICATIONS

| Catalyst | Industry process |
|---|---|
| | Dehydrogenation |
| chrome alumina | Butadiene from butane |
| promoted Fe oxide | Styrene from ethylbenzene |
| | Oxidation, ammoxidation, oxychlorination |
| supported Ag | Ethylene oxidedrom ethylene |
| Pt—Rh gauze | Nitric acid from ammonia |
| $V_2O_5$ on silica | Sulfuric acid from sulfur dioxide |
| $V_2O_5$ | Maleic anhydride from benzene |
| $V_2O_5$ | Phthalic anhydride from o-xylene and naphthalene |
| copper chloride | Ethylene dichloride |
| | Organic synthesis |

TABLE 5B-continued

ILLUSTRATIVE APPLICATIONS

| Catalyst | Industry process |
| --- | --- |
| Pt and Pd on C and Al₂O₃ anhydrous AlCl₃ phosphoric acid | petrochemicals and specialty chemicals Ethylbenzene, detergent alkylate, etc. Cumene, propylene trimer, etc. Polymerization |
| Al alkyls and/or TiCl₃ | Ziegler - Natta processing |
| Cr oxide on silica | Polyethylene (by Phillips process) |
| Peresters | Polyethylene (low density) |
| Percarbonates | Poly (vinyl chloride) |
| benzoyl peroxide | Polystyrene |
| Amines, organotin compounds | Polyurethanes |

TABLE 5C

ILLUSTRATIVE APPLICATIONS

Oxychlorination Catalysts (Fixed bed/Fluid bed)
Catalysts for Methyl Chloride, Methyl Amine, and Melamine processing
Catalysts for isomerization of low carbon hydrocarbons such as C4 and C5/C6
Guard bed catalyst
HDS, HDN, hydrodemetallization and hydrogenation catalyst
Metal and Alloy Catalysts such as but not limiting to NiMo and CoMo
Sulfided catalyst
Catalysts for Ethylene Oxide (EO), one of the major building blocks of the chemical industry, used in the manufacture of Mono Ethylene Glycol (MEG), Ethoxylates, Ethanolamines and many other derivatives. MEG itself is a feedstock for the production of antifreeze, polyester, fibers and PET bottles.
Catalysts for CO₂ Lasers and other equipment so that they can be operated without replenishing the operating gases
Sponge Metal catalysts (also known as raney catalysts)

TABLE 5D

ILLUSTRATIVE APPLICATIONS

Catalysts for FCC Pretreatment
Catalysts for hydrotreatment of heavy VGO or VGO/Resid blends with a high metals content, high CCR and high final boiling point.
Catalysts for Hydrocracking Pretreatment, Mild Cracking, and Hydrocracking
Hydroprocessing catalysts and Fluid Cat Cracking (FCC) Catalyst
Pretreat catalysts in general, such as but not limiting to hydrodemetallization, Conradson carbon removal, hydrodenitrogenation and hydrodesulfurization.
Amorphous and zeolite based Hydrocracking catalysts.
Catalysts for Resid hydrotreatment
Catalysts to derive maximum product value from LPG olefins such as propylene, iso-butylene and iso-amylenes.
Catalysts to maximize octane barrels by improving octane without sacrificing gasoline yield.
Catalysts to maximize production of transportation fuels such as gasoline and diesel from any feedstock.
Catalysts for maximum mid-distillate production, such as diesel and jet fuels.
Catalysts to extend the frontiers of resid cracking, balancing bottoms conversion, low delta coke and metals tolerance.
Catalysts for maximum octanes (RON and MON) and light olefins production

TABLE 5D-continued

ILLUSTRATIVE APPLICATIONS

Catalysts to provide maximum octane barrels for applications where excellent octanes at maximum gasoline yield is required

TABLE 5E

ILLUSTRATIVE APPLICATIONS

Catalysts for selective catalytic reduction (SCR) technology. Illustrative, but not exhaustive applications include Gas Turbines, Chemical Plants (e.g. Nitric Acid, Caprolactam, etc.), Waste Incinerators, Refinery Heaters, Ethylene Crackers, and Gas Motors.
Zeolites and related applications of zeolites (Adsorption, Separation, Catalysts, and Ion Exchange)
Emission-control coatings and systems that remove harmful pollutants, improve fuel economy and enhance product performance in a wide range of applications, including: trucks and buses, motorcycles, lawn and garden tools, forklifts, mining equipment, aircraft, power generation, and industrial process facilities.
Surface coatings for design, manufacture and reconditioning of critical components in aerospace, chemical and petrochemical industries.
Catalysts used in preparing, processing, and treating semiconductor industry gases, liquids, and emissions
Catalysts are capable of destroying ozone (the main component of smog) already in the air.
Catalysts to lower ozone, NOx, and SOx levels
Catalysts for Combustion
Catalysts to improve air quality

TABLE 5F

ILLUSTRATIVE APPLICATIONS OF CLAIMED INVENTION

Catalysts that facilitate the manufacture of petrochemicals, fine chemicals, fats, oils and pharmaceuticals and aid in petroleum refining.
Catalysts that purify fuel, lubrication oils, vegetable oils and fats.
Catalysts for water filtration technologies.
Food and Beverage Industry Catalysts.
Paper, Pulp, and Glass Industry Catalysts
Catalysts for producing Inorganic chemicals
Antimicrobial Catalysts
Catalysts to in-situ produce chemicals used in households
Enzyme and Microbial Catalysts
Catalysts used in biomedical business. Important products include but do not limit to powerful narcotic-based pain killers such as sufentanil, fentanyl base and hydromorphone.
Catalysts used in forensic equipment and sensors
Catalysts used in analytical instruments The teachings of the present invention can be used to research and develop, to rapidly screen novel catalysts by techniques such as combinatorial methods, and to optimize catalysts through the use of arrays in electrical and micro-electronic circuits.

The application of electrical current in particular, and electromagnetic field in general, can enable the ability to extend the life of catalysts, or improve their activity, yields, light off temperatures, turn over rates, stability, and selectivity with or without simultaneous changes in the operating conditions such as temperature, pressure, and flow profile. The catalyst so operated with electromagnetic field is anticipated to enable reactor temperatures and pressures or conditions that are more desirable to customers and integrated to the operating conditions of a specific manufacturing scheme. Furthermore, this invention of applying electromagnetic effects on the catalyst can enable reaction schemes that are switched on or off at will by switching on or off of the electromagnetic field respectively. Such flexibilities can be highly valuable in controlling and enhancing of safety of reactions that may be explosive or that may yield dangerous and hazardous byproducts. The invention can also be applied to produce multiple useful products from same reactor through the variation on-demand of the applied electromagnetic field or feed or other operating conditions required to meet the needs of a particular application.

The benefits of this invention can be practiced in lowering the light-off temperatures in combustion exhaust systems. As one illustration of many applications, it is known in the art that emission control catalysts such as the three-way catalysts placed in automobile exhausts operate efficiently at temperatures greater than about 350° C. These non-ambient temperatures require a heat source and often the exhaust heat from the vehicle's engine is the principal source of the needed heat. During initial start up phase of the engine, it takes about a minute to heat the catalyst to such temperatures. Consequently, the vehicle emission controls are least effective during the start. Methods to rapidly heat the catalyst to such temperatures or lower temperature catalysts are desired. Methods have been proposed to preheat the catalysts by various techniques, however, such techniques require high power to operate, add weight, and are not robust. The teachings contained herein can be used to prepare catalytic units or modify existing catalytic units to operate at lower temperatures (less than 350° C., preferably less than 200° C.) and quicker light-offs. These teachings apply to combustion in general and to emission control systems used in other mobile and stationary units. The teachings may also be practiced by coating the engine cylinder's inside, operating the said coating with electrical current during part of or the complete combustion cycles. Such an approach can help modify the reaction paths inside the cylinder and thereby prevent or reduce pollution-at-source.

The benefits of the teachings contained herein can be applied to the control of difficult-to-treat species such as NOx, SOx, CFCs, HFCs, and ozone. One method is to prevent these species from forming through the use of novel catalytic devices with electrical current in particular, and electromagnetic field in general. Alternatively, using such catalytic devices with electrical current, streams containing these species may be treated with or without secondary reactants such as CO, hydrocarbons, oxygen, ammonia, urea, or any other available raw material, or combinations thereof.

The invention is particularly useful for applications that currently require high temperatures or heavy equipment due to inherently high pressures during reaction or excessive volumes, as the teachings of the presently claimed invention can offer a more economically desirable alternative. Illustrations of such applications, without limiting the scope of this invention, include pollutant treatment or synthesis of fuel and useful chemicals in space vehicles, submarines, fuel cells, miniature systems in weight sensitive units such as automobiles, airplanes, ships, ocean platforms, remote sites and habitats. This can help reduce the weight of the unit, reduce capital costs, reduce inventory costs, and reduce operating costs. Any applications that desire such benefits in general can utilize the teachings of this invention.

The invention can offer an alternative for catalyzing reactions on feeds that contain poisoning species, i.e., species that can cause reversible or irreversible poisoning of available catalysts (for example, but not limiting to, illustrations in Table 6A and 6B).

TABLE 6A

| Process or Product | Catalytic Material | Catalyst Poisons |
|---|---|---|
| Ammonia | $FeO/Fe_2O_3$ promoted by $Al_2O_3$ and $K_2O$ | Moisture, CO, $CO_2$, $O_2$, compounds of S, P, and As |
| Aniline | Ni powder, $Al_2O_3$ Raney-Ni or –Cu, Cu-chromite | Groups VA and VIA elements |
| Butadiene | $Ca_8Ni(PO_4)_6$ $Cr_2O_3$ on $Al_2O_3$ Bi-molybdate $Fe_2O_3 + Cr_2O_3 + K_2O$ | Halides, $O_2$, S, P, Si |
| Ethanol | $H_3PO_4$ on Kieselguhr | $NH_3$, $O_2$, S, organic base |
| Ethylene oxide | Ag-oxide on refractory oxide | Compounds of S |
| Formaldehyde | Ag on $Al_2O_3$ Ag needles $FeO_3 + MoO_3$ | $Cl_2$, S compounds |
| Methanol | $ZnO + Cr_2O_3$ CuO | S compounds, Fe, Ni S compounds |
| Nitric acid | Pt on Rh | Compounds of As and $Cl_2$ |
| Polyethylene | Al-alkyl-Ti tetrachloride Precipitate | Moisture, alcohols, $O_2$, $So_2$, COS, $CO_2$, CO |
| Styrene | (a) $Fe_2O_3 + K_2O + Cr_2O_3$ (b) $Fe_2O_3 + K_2CO_3 + Cr_2O_3 + V_2O_5$ | Halides, S compounds, O, P, Si |
| Sulfuric Acid | $V_2O_5 + K_2O$ on Kieselguhr | Halides, As, Te |
| Cracking, alkylation, and isomerization of petroleum fraction | Synthetic aluminosilicate; $AlCl_3$ $H_3PO_4$ | Organometallic compounds, organic bases |
| Desulfurization, denitrogenation, and deoxygenation | $(NiO + MoO_3)$ $(CcO + MoO_3)$ or $(NiO + WO_3)$ on alumina | $H_2S$, CO, $CO_2$, heavy hydrocarbon deposits, compounds of Na, As, Pb |

TABLE 6B

| Reaction | Active catalyst | Poisons and inhibitors | Mode of action |
|---|---|---|---|
| $NH_3$ synthesis | Fe | S, Se, Te, P, As compounds, halogens $O_2$, $H_2O$, NO $CO_2$ CO unsaturated hydrocarbons | poison: strong chemisorption or compound formation weak poison: oxidation of Fe surface: reduction possible, but causes sintering inhibitor: reaction with alkaline promoters poison and inhibitor: strong chemisorption, on reduction slowly converted to methane: accelerates sintering inhibitor: strong chemisorption, slow reduction |
| Hydrogenation | Ni, Pt, Pd, Cu | S, Se, Te, P, As compounds, halogens Hg and Pb compounds $O_2$ CO | poison: strong chemisorption poison: alloy formation poison: surface oxide film Ni forms volatile carbonyls |
| Catalytic cracking | alumino-silicate | amines, $H_2O$ coking | inhibitor: blockage of active centers poison: blockage of active centers |

TABLE 6B-continued

| Reaction | Active catalyst | Poisons and inhibitors | Mode of action |
|---|---|---|---|
| $NH_3$ oxidation | Pt—Rh | P, As, Sb, compounds; Pb, zn, Cd, Bi rust alkaline oxides | poison: alloying, gauze becomes brittle causes $NH_3$ decomposition poison: reacts with $Rh_2O_3$ inhibitor $d_3$ |
| $SO_2$ oxidation | $V_2O_5$- $K_2S_2O_7$ | As compounds | poison: compound formation |

To illustrate this feature of the present invention, it is well known in the art that precious metal catalysts are useful in numerous reactions. However, these and other catalysts tend to get poisoned when the feed stream contains sulfur or sulfur containing species. Extensive and often expensive pre-treatment of the feed streams is often required to ensure that the catalyst is not poisoned. The present invention describes materials and devices that can catalyze reactions with non-precious metal based formulations that are not known to be poisoned by sulfur. Thus, through appropriate variations in catalyst composition and electromagnetic field, chemical reactions may be realized even if poisoning species are present. This reduces or eliminate the need for expensive and complex pre-treatment of feed streams.

This method is not limited to precious metal poisoning and can be applied to finding catalyst alternatives for presently used catalysts that are based on other materials (supported, unsupported, precipitated, impregnated, skeletal, zeolites, fused, molten, enzyme, metal coordination, ion exchange, bifunctional, basic, acidic, sulfide, salt, oxide, metal, alloys, and intermetallic catalysts). The method is also not limited to sulfur poisoning and the teachings can be used when poisoning or loss in stability is caused by species other than sulfur. The method can also be applied to cases where solutions need to be found for catalysts or systems that undergo coking, thermal run away, and chemical effects.

The invention also offers a method of developing and practicing non-precious alternatives to expensive precious metal-based catalysts. This can reduce catalyst costs. Such uses of invention are desirable in automobile exhaust catalysts, emissions treatment catalysts, naphtha catalysts, petroleum cracking catalysts, and applications that utilize precious metals. Notwithstanding such use and uses discussed earlier, these teachings are not meant to limit to the teachings of presently claimed invention to non-precious metals and materials based thereof. Precious metals and materials based thereof may be used in the practice of this invention's teachings.

The benefits of the teachings contained in this invention can be utilized in research and development and manufacture of inorganic, organic, and pharmaceutical substances from various precursors, such as but not limiting to illustrations in Table 7A, 7B, 7C, 7D, 7E, 7F, and 7G.

TABLE 7A

Illustrative Inorganic Reactants and Product Candidate for Catalysis

| Ammonia | Magnetite | Calcium carbide |
| Ammonium nitrate | Oxides | Calcium carbonate |
| Ammonium carbonate | Nitric acid | Calcium chloride |

TABLE 7A-continued

Illustrative Inorganic Reactants and Product Candidate for Catalysis

| Ammonium perchlorate | Phosphoric acid | Calcium cyanamide |
| Ammonium sulfite | Nitrogen oxides | Calcium hydroxide |
| Carbon | Metals and Alloys | Sulfur |
| Carbon dioxide | Pyrite | Thiourea |
| Carbon disulfide | Sulfur Oxides | Titanium dioxide |
| Carbon monoxide | Carbonates | Urea |
| Radicals | Sodium nitrate | Zinc sulfide |
| Lead Sulfide | Sodium sulfite | Sulfur dioxide |
| Ozone | Alkalis | Hydrogen Sulfide |

TABLE 7B

Illustrative Inorganic Reactions Candidate for Application of this Invention

| Reaction | Current Catalyst |
|---|---|
| Para-$H_2$ conversion | hydrated Fe oxides |
| Production of $H_2$ and CO steam reforming of methane $H_2O + CH_4 \rightarrow 3 H_2 + CO$ | Ni/$Al_2O_3$ |
| watergas shift reaction $CO + H_2O \rightarrow H_2 + CO_2$ | Fe—Cr oxides Cu—Zn oxides |
| Methanation $CO + 3 H_2 \rightarrow CH_4 + H_2O$ | Ni |
| Oxidation of $NH_3$ to NO $NH_3 + 1.25 O_2 \rightarrow NO + 1.5 H_2O$ | Pt—Rh wire gauze |
| Synthesis of ammonia $N_2 + 3 H_2 \rightarrow 2 NH_3$ | $Fe_3O_4$ promoted With K, Ca, Mg, Al |
| Oxidation of $SO_2$ to $SO_3$ | $V_2O_5$ |
| Claus process recovery of S from $SO_2$ + $H_2S$ $2 H_2S + SO_2 \rightarrow 3 S + 2 H_2O$ | $Al_2O_3$ |
| Decomposition of $NH_3$ $2 NH_3 \rightarrow N_2 + 3 H_2$ | Ni/ceramic |

TABLE 7C

Organic Reactants and Product Candidate for Catalysis

| Acetaldehyde | Cyclohexane | Isobutene | Peracetic acid |
| Acetone | Metallorganics | Isocyanates, alcohols | Styrene |
| Acetylene | Cyclohexene | Isoprene | Propylene |
| Acrylonitrile | Cyclopentene | Methane | Adipic Acid |
| Anide | Ethane | Methanol | Aliphatics |
| Aliphatic glycols | Ethanol | Methyl methacrylate | Tetrachlorobenzene |
| Aniline | Ethyl acetate | Nitroacetanilide | Tetranitromethane |
| Acetic Acid | Ethyl nitrate | Nitroalkanes | triphenylsilane |
| Alkanes | Ethyl nitrite | Nitrobenzene | Urea |
| Benzaldehyde | Ethylene | Aromatics | Alkenes |
| Benzene | Ethylene | 2,4-Dinitroacetanilide | Vinyl chloride |
| Ethyl nitrate | Butadiene | n-Pentane | Alkynes |
| Ethyl nitrite | m-Chloroaniline | Phenol, m-cresol | Dendrimers |
| Propylene | Propane | Propionic Acid | Ethylene Oxide |
| Aldehydes | Alcohols | Ketones | Acids |
| Anhydrides | Amines | Isomers | Oxides |
| Sulfur Organics | Phospho-Organics | Salts | Alkaloids |
| Styrene | Nitro Organics | Fullerenes | Bio-derived |
| Cumene | CECs | HFCs | Monomers |
| Cycloalkanes | Cycloalkenes | Cycloalkynes | Cage Compounds |

TABLE 7D

Illustrative Organic Reactions Candidate for Application of the present Invention

| Reaction | Current Catalyst |
|---|---|
| Selective hydrogenation | |
| edible oils | Raney Ni, Ni - NiO/support |
| inedible oils | Raney Ni, Ni - NiO/support |
| acetylene → ethylene | supported Pd + Pb, S, quinoline |
| diolefins → olefins | Pd/Al$_2$O$_3$ |
| unsaturated aldehydes → saturated aldehydes | Pt/support |
| unsaturated aldehydes → saturated alcohols | Pt/support (Zn—Fe) |
| unsaturated nitriles → saturated nitriles | Pd/C |
| unsaturated anhydrides → saturated anhydrides | Pd/support |
| Aromatic hydrogenation | |
| benzene → cyclohexane | Ni/support, Raney Ni |
| phenol → cyclohexanone | Pt/support |
| phenol → cyclohexanol | Pt/support or Ni |
| naphthalene → tetra - and decahydronaphthalenes | Ni/support |
| Asymmetric hydrogenation | Rh - cyclooctadiene with phosphine |
| Hydrogenation | |
| nitriles → amines | Raney Co |
| oximes → hydroxylamines | Pt or Pd |
| aldehydes → alcohols | NiO/support, Cu chromite |
| Reduction | |
| nitro compounds → amines | Pd/C, Cu chromite |
| acids → alcohols | Raney Co, Cu chromite |
| succinic anhydride → butyrolactone | Ni/SiO$_2$ |
| acyl chlorides → aldehydes (Rosenmund reaction) | Pd/BaSO$_4$ |

TABLE 7E

Illustrative Organic Reactions Candidate for Application of the present Invention

| Reaction | Current Catalyst |
|---|---|
| Dehydrogenation | |
| butenes → butadiene | Ca(Sr)Ni phosphate |
| ethylbenzene → styrene | Fe$_2$O$_3$—Cr$_2$O$_3$ (K$_2$O) |
| Butane → butadiene | Cr$_2$O$_3$/Al$_2$O$_3$ |
| Hexane → benzene | Pt/Al$_2$O$_3$ |
| Cyclohexane → benzene | Pt/Al$_2$O$_3$ |
| Cyclohexanol → cyclohexanone | ZnO (alkali) |
| Oxidative dehydrogenation | |
| butenes → butadiene | Bi molybdate |
| alcohols → aldehydes, ketones | ZnO, Cu chromite, Raney Ni |
| Liquid-phase oxidation | |
| ethylene → acetaldehyde | PdCl$_2$—CuCl$_2$ |
| propene → acetone | PdCl$_2$—CuCl$_2$ |
| butene → 2-butanone | PdCl$_2$—CuCl$_2$ |
| ethylene + acetic acid → vinyl acetate | PdCl$_2$—CuCl$_2$ |
| propene + acetic acid → allyl acetate | PdCl$_2$—CuCl$_2$ |
| cyclohexane → cyclohexanol + cyclohexanone | Co acetate |
| butane → acetic acid | Co acetate |

TABLE 7E-continued

Illustrative Organic Reactions Candidate for Application of the present Invention

| Reaction | Current Catalyst |
|---|---|
| acetaldehyde → acetic anhydride | Co acetate |
| cylohexanol + cyclohexanone → adipic acid | V salt (+ HNO$_3$ as oxidant) |
| toluene → benzoic acid | Co acetate |
| benzoic acid → phenol | Cu |
| p-xylene → terephthalic acid | Co acetate |
| m-xylene → isophthalic acid | Co acetate |
| Vapor-phase oxidation | |
| ethylene → ethylene oxide | Ag/support |
| alcohols → aldehydes or ketones | Fe$_2$O$_3$—MoO$_3$ or Ag |
| propene, isobutene → unsaturated aldehydes | Cu$_2$O, Bi molybdate |
| o-xylene, naphthalene → phthalic anhydride | V$_2$O$_5$/TiO$_2$, V$_2$O$_5$—K$_2$S$_2$O$_7$/SiO$_2$ |
| butane or butene → maleic anhydride | V$_2$O$_5$—P$_2$O$_5$/support |
| benzene → maleic anhydride | V$_2$O$_5$—MoO$_3$, (P$_2$O$_5$)/support |

TABLE 7F

Illustrative Organic Reactions Candidate for Application of this Invention

| Reaction | Current Catalyst |
|---|---|
| Ammoxidation | |
| propene + NH$_3$ → acrylonitrile | Bi molybdate, U-sb oxides |
| isobutene + NH$_3$ → methacrylonitrile | multicomponent oxide |
| toluene + NH$_3$ → benzonitrile | V$_2$O$_5$—MoO$_3$/Al$_2$O$_3$ |
| m-xylene + NH$_3$ → isophthalonitrile | V$_2$O$_5$—MoO$_3$/Al$_2$O$_3$ |
| o-xylene + NH$_3$ → phthalonitrile | V$_2$O$_5$—Sb$_2$O$_5$ |
| 3- or 4-picoline + NH$_3$ → 3- or 4-cyanopyridine | V$_2$O$_5$—MoO$_3$/Al$_2$O$_3$ |
| methane + NH$_3$ → hydrogen cynanide | Pt—Rh wire gauze |
| Oxychlorination | |
| ethylene + 2 HCl + 0.5 O$_2$ → vinyl chloride + H$_2$O | CuCl$_2$/Al$_2$O$_3$ |
| Hydration | |
| Ethylene → ethanol | H$_3$PO$_4$/SiO$_2$ |
| propene → 2-propanol | H$_3$PO$_4$/SiO$_2$ |
| dehydration | |
| x-phenylethanol → styrene | NaPO$_3$/SiO$_2$, Al$_2$O$_3$ |
| higher alcohols → olefins | Zeolite |
| acids + ammonia → nitriles | H$_3$PO$_4$/SiO$_2$ |
| butylene glycol → butyrolactone | Zeolite |
| alcohols + ammonia → amines | SiO$_2$/Al$_2$O$_3$ |
| Miscellaneous reactions | |
| benzene + ethylene → ethylbenzene | BF$_3$/Al$_2$O$_3$, AlCl$_3$ |
| benzene + propene → cumene | H$_3$PO$_4$/SiO$_2$ |
| isocyanuric acid → melamine | Al$_2$O$_3$ |
| cumene hydroperoxide → phenol + acetone | H$_2$SO4 |

TABLE 7G

Illustrative Reactions Candidate for
Application of this Invention

| Reaction | Current Catalyst |
|---|---|
| Methanol synthesis | $ZnO$—$Cr_2O_3$ |
| $CO + 2H_2 \rightarrow CH_3OH$ | $Cu$—$ZnO$—$Al_2O_3$ |
|  | $Cu$—$ZnO$—$Cr_2O_3$ |
| Methanation |  |
| $CO + 3H_2 \rightarrow CH_4 + H_2O$ | $Ni/Al_2O_3$ |
| $CO + H_2\ d_3 \rightarrow$ higher alcohols + $H_2O$ | $CuCoM_{0.8}K_{0.1}$oxide, M = Cr, Mn, Fe, or V |
| Fischer - Tropsch synthesis |  |
| $CO + H_2\ d_3 \rightarrow$ hydrocarbons + $H_2O$ | Fe oxide (promoted) |
| Hydroformylation (Oxo reaction) | $HCo(CO)_4$ |
| olefin + $CO + H_2\ d_3 \rightarrow$ aldehyde | $HRh(CO)(PPh_3)_3$ |
| Miscellaneous |  |
| $CH_3I + CO\ d_3 \rightarrow CH_3COI$ | $[Rh(CO)_2I_2]$ |
| $CH_2O + H_2 + CO\ d_3 \rightarrow HOCH_2CHO$ | $HRh(CO)_2(PPh_3)_3$ |
| $CH_2O + CO + H_2O\ d_3 \rightarrow HOCH_2COOH$ | Nafion-H resin |
| Addition | $RhCl_3$ |
| ethylene + butadiene $\rightarrow$ 1,4-hexadiene + 2,4-hexadiene |  |
| Cyclization |  |
| 2 butadiene + cis,cis-1,5m cyclooctadiene | $Ni(acrylonitrile)_2 + PPh_3$ |
| 3 butadiene $\rightarrow$ 2,5,9-cyclododecatriene | $Ni(acrylonitrile)_2$ |
| Olefin metathesis (dismutation) | Mo or $W/Al_2O_3$ or $W/SiO_2$ |
| 2 propene $\rightarrow$ ethylene + butene |  |
| cyclohexene + ethylene $\rightarrow$ 1,7-octadiene |  |
| Oligomerization | $Al(C_2H_5)_3$ |
| 2 ethylene $\rightarrow$ butene |  |
| ethylene $\rightarrow$ $\Theta$-olefins |  |
| Polymerization |  |
| ethylene $\rightarrow$ polyethylene | $TiCl_4 + Al(C_2H_5)_3$ |
| propene $\rightarrow$ polypropylene (isotactic) | $CrO_3/SiO_2$ |
|  | $MoO_3/Al_2O_3$ |
| butadiene $\rightarrow$ polybutadiene | $TiCl_3 + Al(C_2H_5)_3$ |
| 1,4-trans- | $Al(i$-$C_4H_9)_3 + VOCl_3$ |
| 1,4-cis- | $Al(i$-$C_4H_9)_2Cl + CoCl_2$ |
| 1,2-isotactic | $Al(i$-$C_4H_9)_3 + Cr(PhCN)_6$ |
| 1,2-syndiotactic | $Al(i$-$C_4H_9)_3 + MoO_2(O$-$i$-$C_4H_9)_2$ |
| Petrochemistry |  |
| Catalytic cracking | Zeolite, alumina-silica |
| Catalytic reforming | $Pt/Al_2O_3$ or bimetallic catal./$Al_2O_3$ |
| Alkylation | $H_2SO_4$ or HF |
| Isomerization | Pt/alumina |
| Hydrocracking | $Ni/SiO_2$—$Al_2O_3$ or Ni-$W/SiO_2$—$Al_2O_3$ or Pd/zeolite |
| Hydrofining or hydrotreating | Co—$Mo/Al_2O_3$, Ni—$W/Al_2O_3$ |

These benefits of the present invention can also be utilized in the manufacture of fuels, propellants, chemicals, biochemicals, petrochemicals and polymer. Furthermore, the use of electromagnetic energy and active materials in high surface area form can provide benefits in microbe-based, cell-based, tissue-based, and artificial implant-based devices and reaction paths. Finally, the benefits of this invention can be applied to gaseous, liquid, solid, superfluid, plasma or mixed phase reactions. These devices can be enabling to the production of improved and novel products. To illustrate, the catalyst with optimization techniques available in the art can enable devices to produce hydrogen from low cost chemicals, which in turn can be used to prepare hydrogen based engines, alternative fuel vehicles, hybrid vehicles, captive power generation and other applications.

To illustrate, the teachings contained herein, preferably combined with optimization techniques available in the art, can enable affordable devices to produce hydrogen from low-cost chemicals (such as but not limiting to methanol, agriculturally derived ethanol, gasoline, natural gas, gasohol), which in turn can be used to prepare hydrogen based engines, alternative fuel vehicles, hybrid vehicles, captive power generation and other applications. The teachings can assist in reducing the costs of implementing novel engine-based vehicles and power generation equipment since the distribution infrastructure of said low-cost chemicals to homes, buildings, and roads already exists.

The novel chemical composition transformation method and devices as described can be utilized to degrade undesirable species from a feed into more preferred form. Illustration include degradation of species such as toluene, methylethyl ketone, ethylene oxide, methylene chloride, formaldehyde, ammonia, methanol, formic acid, volatile organic vapors, odors, toxic agents, biomedical compounds into intermediates or final products such as carbon dioxide and water vapor. In another application, organics in liquid streams may be treated using these devices. Alternatively, novel chemical composition transformation devices as described can be utilized to remove and recover precious and strategic metals from liquid waste streams; or to remove hazardous metal ions from waste streams (waste water). The device can also be used to purify fluid streams by removing low concentrations of contaminants such as in preparing extremely pure water or extremely pure gases needed in semiconductor device manufacturing.

The invention can be applied to automatically and on-demand clean contaminants and stained surfaces such as windows in skyscrapers and hotels, and window shields of automobiles and aircraft. Stains are often organic in nature or comprises of substances that change the refractive index of a surface. A thin nanostructured coating of transparent ceramic or film (such as but not limiting to indium tin oxide, doped glasses, metals, and ceramics) can be deposited with electrodes printed connecting said film. The film can be part of an electrical circuit that is triggered on-demand to catalyze the substance in any stain on surface of interest. The invention may also be integrated in air conditioners, heating, and ventilation systems to clean air, or at-source and conveyors of emissions such as carpets, combustion chambers, and ducts. The teachings can also be utilized to build low-cost odor control systems inside microwaves, refrigerators, and portable or plug-in type odor removal devices at homes and offices. Odors are organic chemicals and preferred method of treating odors is to transform the chemicals responsible for odor into carbon oxide and moisture. The teachings contained herein can be applied to produced catalytic units that transform the chemicals responsible for odors into more desired products. Similarly, the teachings can yield devices to address the problems inside printers and photocopiers and other such office and industrial equipment that emit gases such as ozone and volatile chemicals.

The invention can enable the use of multifunctional equipment. An illustration of this, without limiting the scope, would be to coat the surface of a pipe with conducting formulation and then conduct the reaction while the raw material has been transported from source to some desired destination. The pipe in this case performs more than one function—it helps transport the feed and it also enables the reaction to occur during such transport.

The invention can be applied in membrane reactors, ion exchange units, catalytic distillation, catalytic separation, analytical instruments, and other applications that combine the benefits of catalysts with chemical unit operations known in the art.

This invention can also be utilized to develop and produce products that are based on catalytic or high surface area-based properties of materials used in the product. An illustrative, but not limiting, product of this type would be one that sense, react, trigger, or adapt to changes in environment in general, and in the chemical composition of a fluid in particular such as the teachings in commonly assigned U.S. patent application Ser. No. 09/074,534 filed May 7, 1998, pending, and which is incorporated herewith. The invention can be generically applied to develop and produce products that sense, react, trigger, or adapt to changes in the environment such as changes in the thermal state, mechanical state, magnetic state, electromagnetic state, ionic state, optical state, photonic state, chromatic state, electronic state, biological state, or nuclear state, or a combination of two or more of these. In all cases, when the teachings contained herein are applied to a device in conjunction with electrical field, the benefit obtained is the modification of surface state of the active material and/or the modification in the property of the active material and/or the modification in the environment, as the said surface interacts with the environment.

As a non-limiting example, if the active layers are prepared from thermally sensitive material compositions, rapid response thermal sensors can be produced. In another example, if piezoelectric compositions are used in the active layer in a multilaminate stack, vibration and acceleration sensors can be produced. In yet another example, magnetic compositions can yield rapid response magnetic sensors and magnetoresistive sensors. If the active layer instead is prepared from compositions that interact with photons, novel chromatic, luminescent, photodetectors and photoelectric devices may be produced. With compositions interacting with nuclear radiation, sensors for detecting nuclear radiation may be produced. In another example, with biologically active layers, biomedical sensors may be produced. With insulating interlayers, these device may be thermally isolated or made safe and reliable. The active layers can be mixed, as discussed before, to provide multifunctional devices and products. The sensing layers may be cut or left intact for specific applications. The sensing layer may be just one layer or a multitude of as many layers as cost-effectively desirable for the application. The electrode may also be one layer or a multitude of as many layers as cost-effective and necessary for the application. These sensors have performance characteristics desired in chemical, metallurgical, environmental, geological, petroleum, glass, ceramic, materials, semiconductor, telecommunications, electronics, electrical, automobile, aerospace and biomedical applications. Such sensors can be combined with metrology techniques and transducers to produce smart products and products that adapt and learn from their environments.

EXAMPLE 1

Indium Tin Oxide as Active Material

A slurry of high surface area indium tin oxide and aluminum oxide in iso-propanol is prepared and about 10 micro-litter of the slurry is deposited on an alumina substrate (6 mm×6 mm×2.5 mm) with gold electrodes formed on the substrate in a pattern similar to that shown in FIG. 2. The sample is dried at room temperature. This procedure yields 2 mg of catalyst film covering a portion of the substrate surface. The thin film is reduced in a flow through quartz tube reduction system in 5% $H_2$ in Nitrogen at 300° C. After 30 minutes its resistance drops to 400 ohms, with a visible change of color to green-blue. The reduced or activated thin film is transferred to the reactor and is exposed to 100 ml/min of Methanol/Air under a small electric field. The results of this experiment are tabulated in the following table.

TABLE 8

| Voltage (volts) | Current (amps) | Temp (C.) | H$_2$ % | Conversion % MeOH |
|---|---|---|---|---|
| 8.2 | 0.052 | 108 | 0.45% | 30% |
| 8.4 | 0.06 | 121 | 0.61% | 30% |
| 8.75 | 0.075 | 140 | 0.62% | 31% |

This example suggests that field assisted catalysis can produce hydrogen from methanol and air at average substrate temperatures below 150° C. Alternatively, this example suggests that hydrogen can be produced from alcohols such as methanol with power consumption levels of less than 2 KWhr per 100 l of hydrogen produced.

EXAMPLE 2
Effect of Smaller Substrate
The slurry of Example 1 is printed on a 4 mm×4 mm substrate instead, everything else remaining same. By reducing the substrate size, the system's thermal mass (i.e. thermal mass of the substrate added to the thermal mass of the catalyst) is less than that of Example 1. The results of this experiment are tabulated in the following table.

TABLE 9

| Voltage (volts) | Current (amps) | Temp (C.) | H$_2$ % | Conversion % MeOH |
|---|---|---|---|---|
| 6.8 | 0.02 | 120 | 1.0 | 30 |

The thermal mass of the system in example 2 is less than that of example 1. This example suggests that reducing substrate size reduced the input power required to achieve efficient conversion. Hence, reducing thermal mass can enhance the performance of field assisted catalysis during the production of hydrogen from methanol and air. Specifically, this example suggests that hydrogen can be produced from alcohols such as methanol with power consumption levels of less than 0.5 KWhr per 100 l of hydrogen produced.

EXAMPLE 3
Effect of Higher Resistance
This example differs from Example 1 in that the slurry is printed in thinner form and larger area to yield higher resistance, everything else remaining same. As a result, the catalyst film covers a larger portion of the substrate surface than in Example 1. The results of this experiment are tabulated in the following table.

TABLE 10

| Voltage (volts) | Current (amps) | Temp (C.) | H$_2$ % | Conversion % MeOH |
|---|---|---|---|---|
| 6.9 | 0.029 | 108 | 0.95 | 30 |

This example suggests that further optimization of parameters including, but not limited to, catalyst film and substrate porosity, surface area, uniformity, dopant(s) concentration, shape/architecture, mechanical properties such as stress, strain, and thermal conductivity, number of layers, electrode pattern, electrode composition, film composition, substrate composition, substrate thermal mass, and substrate thickness offer opportunities to improve field assisted catalysis technology. Reducing thermal mass can enhance the performance of field assisted catalysis during the production of hydrogen from methanol and air. Specifically, this example suggests that hydrogen can be produced from alcohols such as methanol with power consumption levels of less than 0.5 KWhr per 100 l of hydrogen produced.

EXAMPLE 4
Effect of Alternating Current
The film of example 2 is used again. The field is provided using 60 Hz alternating current instead of direct current, yielding results summarized in Table 11.

TABLE 11

| Voltage (volts) | Current (amps) | Temp (C.) | H$_2$ % | Conversion % MeOH |
|---|---|---|---|---|
| 82 | 0.0012 | 112 | 0.73 | 26.5 |

This example suggests that time varying fields such as alternating and pulsating fields can be used in field catalysis technology. Specifically, this example suggests that hydrogen can be produced from alcohols such as methanol with alternating current passing through the catalyst.

EXAMPLE 5
Initiating Reaction with Current Flow, and Zero Steady State Current
A slurry of high surface area indium tin oxide and 25% by weight aluminum oxide in iso-propanol is prepared and about 10 micro-litter of the slurry is deposited on an alumina substrate (4 mm×4 mm×2.5 mm) with gold electrodes. The sample is dried at room temperature. This procedure yields about 1.5 mg of catalyst on the surface. The thin film is reduced in a flow through quartz tube reduction system in 5% H$_2$ in Nitrogen at 300 C. After 30 minutes its resistance drops to about 2800 ohms, with a visible change of color to green-blue. The reduced or activated thin film is transferred to the reactor and is exposed to 100 ml/min of dry air saturated with methanol. 8.5 volts of direct current was passed through the film for 15 minutes which yielded 0.035 amps of current. The warming of the film reduced the film's resistance. The catalyst film was observed to produce 1.2% by volume hydrogen at about 110° C. Two hot spots were witnessed on the film as evidenced by appearance of orange-red spots in the film. After the appearance of the hotspots, and the electric field was switched off while the hotspots remained apparent In this example, the reaction stabilized with adiabatic operation and the film continued to produce 0.9% by volume hydrogen for over 2 hours, with no evidence that the reaction would stop so long as the methanol supply was continued.

A small (e.g., 0.05 Ampere) and temporary burst of current to the film over a five second period further changed its performance. The resistance of film increased to about 5,500 ohms and the average substrate temperature dropped to about 50° C., while hydrogen production increased to about 1.75% by volume. This state was observed to be steady for over five hours. Specifically, this mode of operation demonstrated the ability to produce hydrogen from methanol at about 0.9% by volume concentrations, with average substrate temperatures less than 40° C. for over three hours.

This example suggests that electromagnetic fields can be used to activate catalysis. It is believed that current bursts for a time period greater than about one second will enable continued activity of the film for extended times or indefinitely after the electric field is removed, thereby conserving input power. Subsequent current bursts create new hotspots and increase the net catalytic activity of the catalyst film. Recurrent current bursts such as periodic current bursts are expected to maintain the activity of the film in a productive state for an indefinite period of time. Specifically, this example suggests that hydrogen can be produced from alcohols such as methanol by electric field activation. Furthermore, this example illustrates a method of producing greater than 0.5% by volume hydrogen from alcohols and air at temperatures less than 100° C., preferably less than 50° C.

EXAMPLE 6
Thin Transparent Film as a Catalyst

This example suggests that the role of the current is fundamentally and surprisingly different than merely providing heat to the catalysts. Furthermore, we show that chemicals that are more complex than the feed can be synthesized by the technology in accordance with the present invention and that the present invention is not limited to reactions that produce simpler species (e.g., hydrogen) from more complex feed materials.

This example involves a 5 mm×5 mm glass slide coated with 90:10 by weight % indium tin oxide, a transparent thin film. The indium tin oxide coating was cleaned to remove any dust or chemicals and it was ensured that the slide was optically clear. The slide was heated with an external electric heater placed next to the slide. At a heater voltage of 22.3 volts and current of 0.14 amps, the slide temperature was observed to be 203° C. No hydrogen production was observed. Furthermore, no methanol conversion was detected over a period of 30 minutes with the external heating.

Next the indium tin oxide surface was placed in a direct current circuit. It was observed that with 24.1 volts, the film conducts electric current of 0.12 amps. The slide temperature was observed to be 120° C. No hot spots were detected on the transparent slide. No hydrogen was detected. However, 26% of feed methanol converted to a waxy material. The waxy material suggests an end product having a chain length greater than the feed material. This result suggests that fine chemicals can be produced by this technology. This example illustrates the wide applicability of this technology to produce chemicals with chain lengths longer than the feed material.

EXAMPLE 8
Thick Transparent Film as Catalyst

In this example, polymeric metal organic oxoalkoxide was used as tin doped indium oxide precursor (Alfa Aesar, Product Code 42229). 50 mg of the precursor was coated on a glass substrate to yield a thick film. The precursor was heated to 400° C. to crystallize the oxide film. This yielded a transparent film. The film was reduced in 5% hydrogen for 30 minutes to yield a bluish translucent film. The reduced and activated catalyst was transferred to the reactor and is exposed to 100 ml/min of dry air saturated with methanol under a small electric field. With 16 volts and 0.12 amps of direct current, the film temperature was observed to be 142° C. Methanol conversion was observed to be 27% and 1% by volume of hydrogen was observed using a calibrated gas chromatograph. This example illustrates that catalysts can be produced by a wide range of methods to practice field assisted technology.

These examples illustrate the utility of catalyst films in the practice of field assisted transformation of chemical and material compositions. Catalyst films supported by substrates and membranes as well as self-support catalyst films exhibit improved efficiency in converting chemical compositions from a feed product to an end product. It is contemplated that a wide variety of electrode patterns, substrate compositions, membrane compositions, and catalyst materials will benefit from the utility of these features of the present invention.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

We claim:

1. A method of conducting chemical reactions comprising the acts of:
   providing a quantity of a catalyst with interface area greater than 1 square centimeter per gram on a ceramic substrate;
   exposing a chemical composition to the quantity of catalyst; and
   providing a flow of charge in the quantity of catalyst by applying an electromagnetic field across the quantity of catalyst during the exposure to the chemical composition, wherein the flow of charge is provided for a period of time sufficient to initiate a chemical reaction.

2. The method of claim 1 wherein the period of time is greater than about 1 second.

3. The method of claim 1, wherein the step of providing a flow of charge comprises applying a voltage across the quantity of catalyst.

4. The method of claim 1, wherein the catalyst comprises one or more nanopowders.

5. A method of conducting chemical reactions comprising the acts of:
   providing a quantity of a catalyst with interface area greater than 1 square centimeter per gram;
   exposing a chemical composition to the quantity of catalyst;
   providing a flow of charge in the quantity of catalyst by applying an electromagnetic field across the quantity of catalyst; and
   stopping the flow of charge while a chemical reaction continues.

6. The method of claim 5 wherein the step of providing a flow of charge comprises providing a flow of charge for a period of time sufficient to initiate the chemical reaction.

7. The method of claim 5 wherein the step of providing a flow of charge comprises providing a DC flow of charge in the catalyst.

8. The method of claim 5 wherein the step of providing a quantity of catalyst comprises providing a film layer of catalyst.

9. The method of claim 8, wherein the film layer comprises a thin film layer formed on a supporting substrate.

10. A method of conducting chemical reactions comprising the acts of:
    providing a quantity of a catalyst with interface area greater than 1 square centimeter per gram;
    exposing a chemical composition to the quantity of catalyst;

providing a flow of charge in the quantity of catalyst, wherein the step of providing a flow of charge comprises providing a time varying alternating current flow of charge in the catalyst; and stopping the flow of charge while a chemical reaction continues.

11. A method of conducting chemical reactions comprising the acts of:

providing a quantity of a catalyst with interface area greater than 1 square centimeter per gram;

exposing a chemical composition to the quantity of catalyst;

providing a flow of charge in the quantity of catalyst, wherein the step of providing a flow of charge comprises providing a flow of charge in less than all of the quantity of catalyst; and stopping the flow of charge while a chemical reaction continues.

12. A method of chemical transformation of a feed composition into a product composition, the method comprising the steps of:

providing at least one electrode;

providing a selected substance with interface area greater than 1 square centimeter per gram;

coupling the selected substance electrically to the at least one electrode;

exposing the selected substance to the feed composition; and causing charge to flow from the at least one electrode through the selected substance for a period of time sufficient to initiate catalyzation of the chemical transformation; and stopping the flow of charge through the selected substance while continuing to catalyze the transformation of the feed composition into the product composition.

13. The method of claim 12, wherein the step of causing a charge to flow further comprises applying a voltage across the selected substance using the at least one electrode to create an electrical current in the selected substance.

14. The method of claim 12, wherein the substance comprises a nanopowder.

15. The method of claim 12, wherein the step of causing the selected substance to catalyze the transformation of the feed composition into the product composition occurs at operating temperature less than or equal to ignition temperature of the feed composition.

16. The method of claim 15, wherein the operating temperature is less than 250° C.

17. A device for transforming chemical composition of a stream comprising:

a ceramic substrate;

a substance on the substrate, the substance having interface area greater than 1 square centimeter per gram and a surface exposed to the stream;

an electrical circuit coupled to the substance and providing a flow of charge in the substance during exposure to the stream for a period of time sufficient to cause the substance to catalyze the chemical transformation of the stream, and a control mechanism coupled to the electrical circuit to cause the electrical circuit to reduce the flow of charge in the substance after the substance begins to catalyze the transformation of the stream.

18. The device of claim 17, wherein the substance comprises a nanopowder.

19. The device of claim 17, wherein the substance comprises a composite.

20. The device of claim 17, wherein the substance comprises a multilayer structure.

21. The device of claim 17, wherein the substance has a resistance between 0.001 milliohm and 100 megaohms per unit ampere of current passing through the substance.

22. The device of claim 17, wherein the substance is selected to catalyze the chemical transformation at an operating temperature less than or equal to ignition temperature of the stream.

23. A method of treating pollutants comprising the acts of:

providing a substance with interface area greater than 1 square centimeter per gram;

providing at least one electrode coupled to the substance;

exposing the substance to the pollutants;

causing a charge to flow in the substance by applying an electromagnetic field across the substance such that the substance catalyzes the pollutants; and removing the flow of charge in the quantity of catalyst while the substance continues to catalyze the pollutants.

24. A method of producing a preferred substance from raw substances comprising the acts of:

providing a catalyzing substance with interface area greater than 1 square centimeter per gram; and, placing the catalyzing substance in an electrical circuit; and, exposing the raw substances to the catalyzing substance; and, causing a charge to flow in the catalyzing substance by applying an electromagnetic field across the catalyzing substance using said electrical circuit for a period of time sufficient to initiate catalysis of the raw substances into the preferred substance; and removing the flow of charge while the catalysis of the raw substances continues.

25. The method of claim 24, wherein the preferred substance comprises at least one of: hydrogen, organic chemical, inorganic chemical, or biochemical.

26. The method of claim 24, wherein the catalyzing substance has an operating temperature less than or equal to ignition temperature of the raw substances.

27. The method of claim 24, wherein the flow of charge is an electrical current from an applied voltage across the catalyzing substance.

28. The method of claim 24, wherein the electrical power to the catalyzing substance is less than 15 Watts per gram of catalyzing substance.

29. A system for processing chemical compositions comprising:

an inlet port coupled to receive an external source of a first composition;

an catalyst material comprising a substance with interface area greater than 1 square centimeter per gram, wherein the catalyst material is positioned with respect to the inlet port so as to expose the first composition to the catalyst material;

a control mechanism for selectively applying an electric field across the catalyst material;

means for providing a charge flow in the catalyst material during application of the electric field at a preselected magnitude for a preselected duration, wherein the control mechanism is configured to apply the electric field in a time varying manner selected to initiate transformation of the first composition into a second composition during exposure to the catalyst material while the charge is flowing; and an outlet port positioned with respect to the catalyst material to port the second composition away.

30. A method of producing hydrogen comprising the acts of:

providing a quantity of a catalyst with interface area greater than 1 square centimeter per gram;

exposing a hydrogen containing compound to the quantity of catalyst;

providing a flow of charge in the quantity of catalyst by applying an electromagnetic field across the quantity of catalyst during the exposure to the hydrogen containing compound for a time period selected to initiate catalysis of the hydrogen containing compound to form hydrogen; and reducing the flow of charge in the quantity of catalyst while continuing the catalysis of the hydrogen containing compound to form hydrogen.

31. The method of claim 30, where the hydrogen containing compound comprises an alcohol.

32. A method of cleaning comprising the acts of:

coating a surface with a catalyzing substance having an interface area greater than 1 square centimeter per gram;

placing the catalyzing substance in an electrical circuit; and causing a flow of charge in the catalyzing substance using the electrical circuit for a period of time sufficient to remove a contaminant on the surface.

33. The method of claim 32 wherein the surface comprises a glass surface.

34. The method of claim 32 wherein the contaminant comprises a stain.

35. The method of claim 32 wherein the contaminant comprises microbes.

36. The method of claim 32 wherein the catalyzing substance is nanostructured.

37. A method of controlling odor comprising the acts of:

providing a catalyzing substance having an interface area greater than 1 square centimeter per gram;

placing the catalyzing substance in an electrical circuit; and causing a flow of charge in the catalyzing substance using the electrical circuit for a period of time sufficient to eliminate the odor.

* * * * *